United States Patent [19]

Nishikawa et al.

[11] Patent Number: 5,761,658
[45] Date of Patent: Jun. 2, 1998

[54] METHOD OF EXCLUSIVE CONTROL OF AREAS IN PAGE FOR TUPLE-ORIENTED FILE SYSTEM

[75] Inventors: Norifumi Nishikawa, Amagasaki; Hideo Munetica, Kobe; Satoshi Wakayama, Sakai; Nobuo Kawamura, Sagamihara, all of Japan

[73] Assignees: Hitachi, Ltd., Tokyo; Hitachi Software Engineering Co., Ltd., Yokohama, both of Japan

[21] Appl. No.: 511,088

[22] Filed: Aug. 3, 1995

[30] Foreign Application Priority Data

Aug. 10, 1994 [JP] Japan .................. 6-188080

[51] Int. Cl.[6] .................................................. G06F 17/30
[52] U.S. Cl. .......................... 707/8; 707/206; 707/101; 707/100; 711/150
[58] Field of Search .......................... 395/618, 425, 395/427, 601, 621, 250, 616, 602, 608, 611; 707/206, 101, 8, 100; 711/150

[56] References Cited

U.S. PATENT DOCUMENTS

| | | | |
|---|---|---|---|
| 4,627,019 | 12/1986 | Ng | 395/608 |
| 4,961,134 | 10/1990 | Crus et al. | 707/8 |
| 4,961,139 | 10/1990 | Hong et al. | 395/601 |
| 4,979,109 | 12/1990 | Tanaka et al. | 395/611 |
| 5,058,002 | 10/1991 | Nakamura et al. | 395/621 |
| 5,193,162 | 3/1993 | Bordsen et al. | 395/425 |
| 5,237,661 | 8/1993 | Kawamura et al. | 395/250 |
| 5,247,672 | 9/1993 | Mohan | 395/608 |
| 5,317,727 | 5/1994 | Tsuchida et al. | 395/602 |
| 5,327,556 | 7/1994 | Mohan et al. | 707/8 |
| 5,333,314 | 7/1994 | Masai et al. | 395/618 |
| 5,333,316 | 7/1994 | Champagne et al. | 395/608 |
| 5,440,732 | 8/1995 | Lomet et al. | 395/608 |
| 5,485,607 | 1/1996 | Lomet et al. | 395/608 |
| 5,530,854 | 6/1996 | Emery et al. | 707/100 |
| 5,544,356 | 8/1996 | Robinson et al. | 395/621 |
| 5,555,388 | 9/1996 | Shaughnessy | 395/427 |
| 5,590,326 | 12/1996 | Manabe | 711/150 |

OTHER PUBLICATIONS

Stamos et al. "A Symmetric Fragment and Replicate Algorithm for Distributed Joins", IEEE Transactions on Parallel and Distributed System, v4, No. 12, pp. 1345-1354, Dec. 1993.

Jeong et al. "Plinda 2.0: A Transactional/Checkpointing Approach to Fault Tolerant Linda", Reliable Distributed Systems, 1994 13th Symposium, pp. 96-105.

DeWitt et al., "Parallel Database Systems: The Future of High Performance Database Systems", Communications of the ACM, v35, v35, p. 85(14), Jun. 1992.

Yen, I-Ling "Multiple Invariant System Design for Fault-Tolerant Real-Time Applications", WORDS '96, pp. 101-107.

(List continued on next page.)

Primary Examiner—Thomas G. Black
Assistant Examiner—Charles L. Rones
Attorney, Agent, or Firm—Fay, Sharpe, Beall, Fagan, Minnich & McKee

[57] ABSTRACT

An area in a page for a tuple-oriented file system is exclusively controlled such that a tuple is added to, deleted from or updated in a page including a tuple area in use, a vacant area having a deleted tuple and an unoccupied area. In the case where a transaction is active for increasing the total size of the vacant area in a given page, the particular vacant area is locked to prevent another active parallel transaction from using the same vacant area. During the time when the transaction for increasing the total size of the vacant area remains active, other transactions can add a tuple to the unoccupied area or update a tuple in use in the same page to the extent that the particular page is not compacted. The transaction for increasing the total size of the vacant area can perform a special compaction for collecting a plurality of discrete vacant areas into a continuous vacant area without increasing the unoccupied area in the page. The roll back operation can thus be executed securely.

18 Claims, 23 Drawing Sheets

OTHER PUBLICATIONS

King et al. "Overview of Disaster Recovery for Transaction Processing Systems", Distributed Computing Sytsems, 1990 International Conference, pp. 286–293.

Murthy et al. "Gamma Programming Paradigm and Heterogenous Computing", System Science, 1996 Annual Hawaii Int'l Conference, v1, pp. 273–281.

Wu et al. "Rapid Transaction–Undo Recovery Using Twin–Page Storage Management", v19, No. 2, pp. 155–164, Feb. 1993.

Jim Gray, Andreas Reuter; Transaction Processing: Concepts and Techniques, Morgan Kaufmann Publishers, Inc., 1993, pp. 752–761 and 794–819. (English).

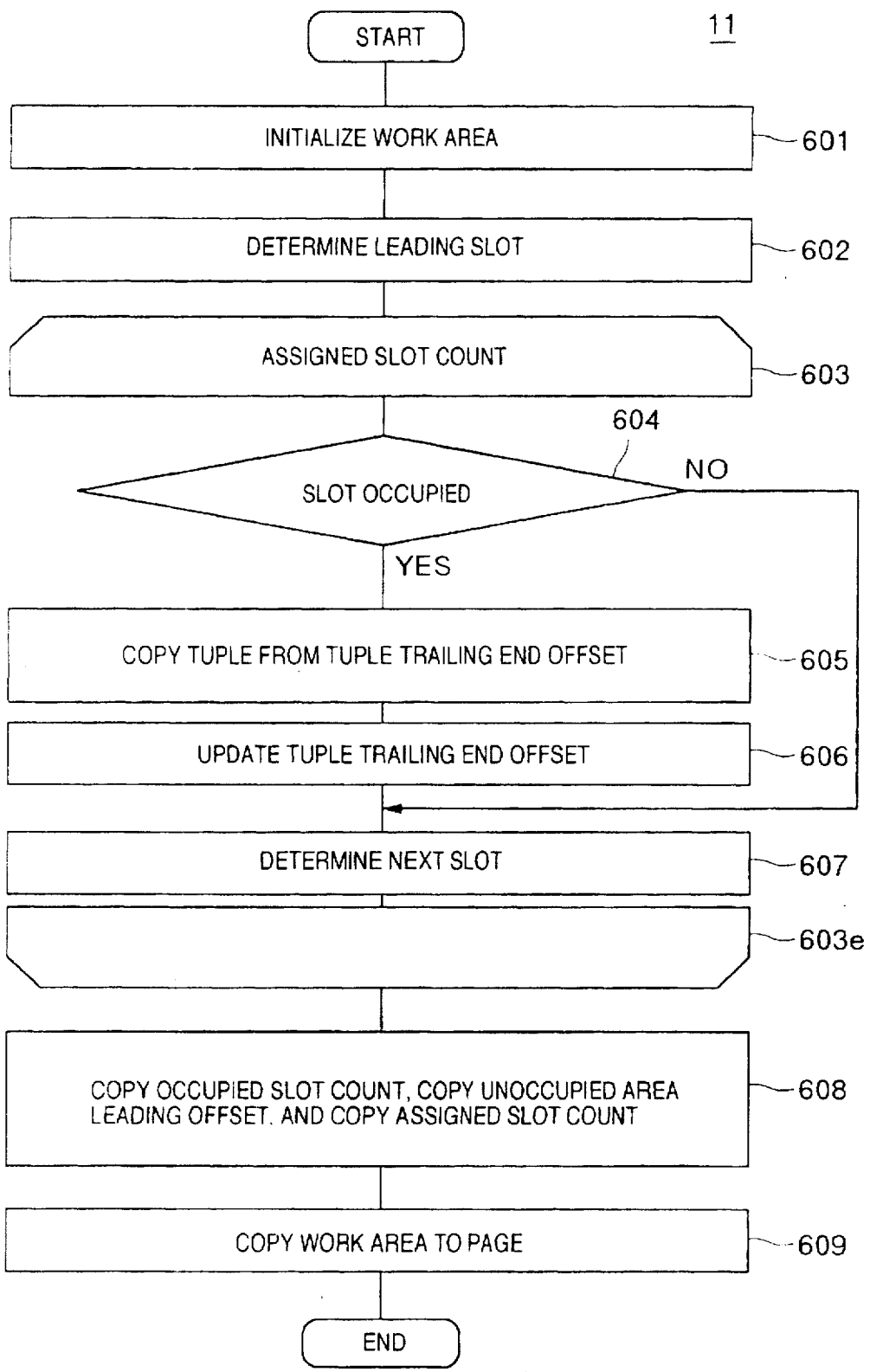

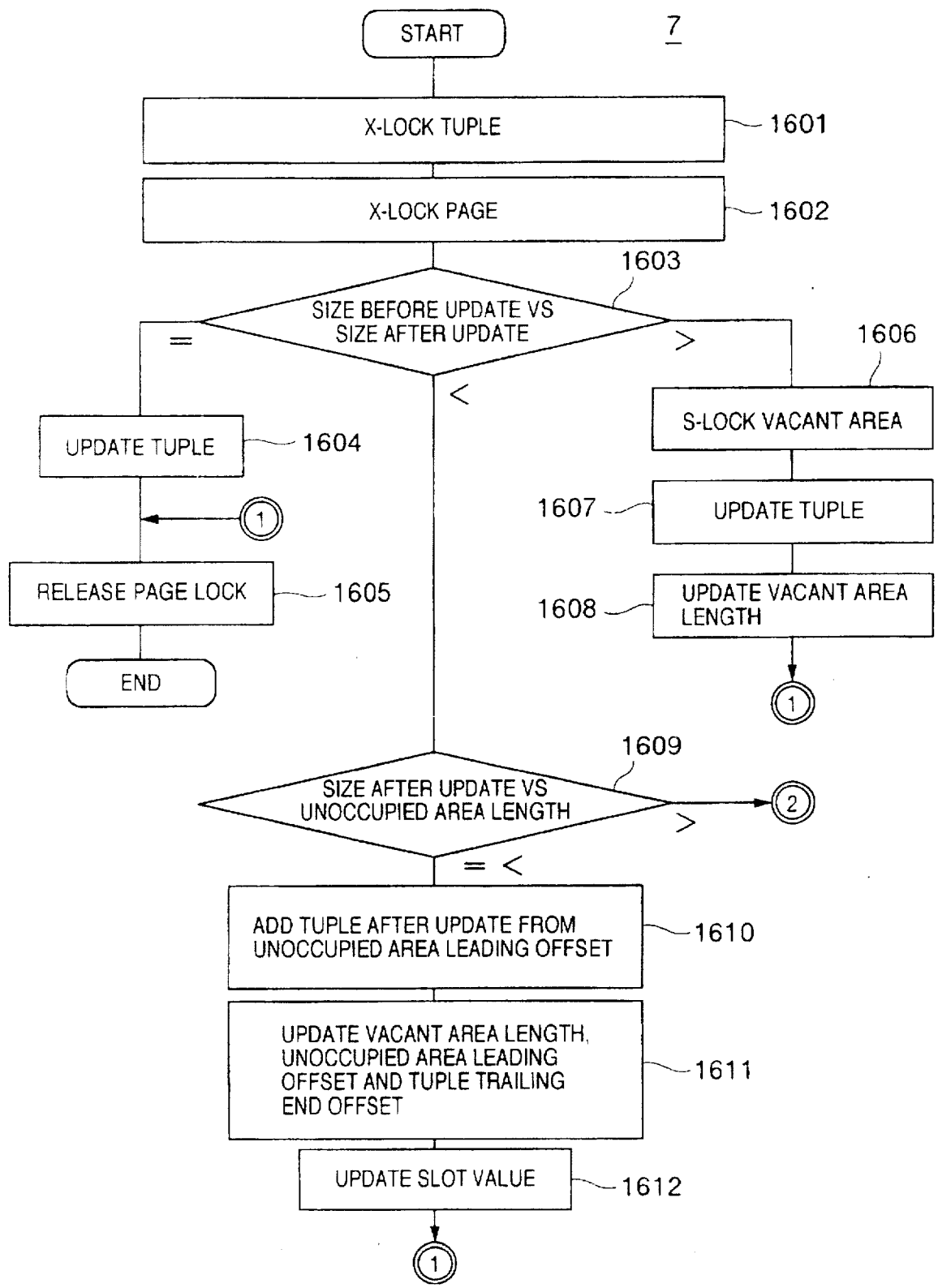

METHOD OF EXCLUSIVE CONTROL OF AREAS IN PAGE FOR TUPLE-ORIENTED FILE SYSTEM

BACKGROUND OF THE INVENTION

The present invention relates to a method of exclusive control for a tuple-oriented file system, or more in particular to a method of exclusive control of areas in a page for a database management system for managing the data base storing data accessed by a plurality of transactions.

A database management system for managing the database storing data accessed by a plurality of transactions has recently been available in which records are configured as a tuple-oriented file system.

In the case where records of a data base are configured of a tuple-oriented file system, as described in Jim Gray, Andreas Reuter; TRANSACTION PROCESSING: CONCEPTS AND TECHNIQUES, Morgan Kaufmann Publishers, Inc., 1993, pp. 752–761 and pp. 794–819, each page contains a plurality of records, each of which in turn is represented as at least a tuple. An example page configuration is shown in FIG. 2. Page 201 includes a plurality of tuples 202 and a plurality of slots 203. Each slot stores the position in the page of the tuple indicated by the particular slot, and each tuple is uniquely identified by the page number and the slot number (hereinafter referred to as "the physical identification numbers"). A tuple can be added in the positive direction of address (incremental direction), and the slot in the negative direction of address (decremental direction).

The condition in each page is managed by a page header 207. Items managed by the page header include a leading offset 206 of an unoccupied area 205 in the page, the size of a vacant area which may occur when a tuple is eliminated or shortened, a maximum slot number assigned to the page and the number of slots in use.

In the case where a tuple is added to a page with an unoccupied area 205 larger than the size required for adding a new tuple, such a tuple is added from the leading offset 206 of the unoccupied area 205. In the case where the unoccupied area 205 is not sufficiently large as compared with the tuple to be added although the sum of the size of the unoccupied area 205 and the size of the entire vacant area 204 is larger than the size required for adding a new tuple, on the other hand, tuple addition is made possible by page compaction (as described later). When the sum of the size of unoccupied area and the size of the vacant area is not sufficiently large for adding a tuple, by contrast, either the tuple to be added can be inserted in another page or a part of the tuple to be added is inserted in the page and the remaining part of the tuple into another page.

A data base is normally accessed simultaneously by a plurality of transactions. In the above-mentioned tuple-oriented file system, assume that after a given transaction 1 deletes a tuple from a given page, another tuple is added by another transaction after compaction of the page, and the commitment has been carried out to update data before the termination of the first transaction. After that, when transaction 1 rolls back, the particular page may lack a vacant area sufficient to restore the deleted tuple, thereby making it impossible to restore the tuple.

A method for solving this problem is proposed by exclusively locking the page until the termination of a transaction that has accessed the page. According to another method, in the case where the unoccupied area or the vacant area in the page increases in size due to tuple deletion or otherwise by a transaction, an unoccupied area table used for managing the size of the unoccupied areas of the page is locked until the termination of the transaction, during which period a tuple reference is allowed while any process is prohibited which consumes the size of the unoccupied area or the vacant area of the page, thereby securing an area required for restoring a tuple.

In the former of the conventional methods described above, other tuples included in the same page cannot be accessed by other transactions until the termination of a transaction, and thus the parallelism of transactions is reduced. According to the latter of the conventional methods described above, on the other hand, although other tuples can be referenced or can otherwise be accessed for update, delete or the like which does not consume the unoccupied area or vacant area of the same page, a tuple cannot be added or updated as it consumes an unoccupied area. Thus the unoccupied or vacant area in a page cannot be used effectively.

With an object-oriented database, more than one tuple are normally combined to represent a complex data structure. In order to improve the access speed to these data, a storage schema is employed for arranging these tuples within the same page as far as possible. In the latter of the conventional methods described above, when a tuple is deleted or updated in a page, other tuples cannot be stored in the same page. The access speed to data having a complex structure is thus reduced.

SUMMARY OF THE INVENTION

A first object of the present invention is to provide a method of exclusive control of areas in a page for a tuple-oriented file system, in which a deleted tuple can be restored without changing the physical identification number thereof at the time of roll back processing of a given transaction on the one hand and without reducing the parallelism of transactions on the other hand.

A second object of the present invention is to provide a method of exclusive control of areas in a page for a tuple-oriented file system, in which a vacant area and an unoccupied area in a page can be effectively used.

According to one aspect of the invention for achieving the above-mentioned first object, there is provided a method of exclusive control of areas in a page by a system including tuple access means for performing the steps of requesting exclusive control of a tuple, requesting exclusive control of a page, requesting exclusive control of a vacant area in a page and deciding whether a vacant area in a page can be used, and means for executing an improved compaction (which means a compaction performed within areas other than the unoccupied area in a page) provided in addition to normal compaction means, means for deciding whether a transaction increasing the total size of the vacant area in a page is active, and means for preventing the vacant area of the same page from being used when the transaction is active.

According to a second aspect of the invention for achieving the second object, there is provided a method of exclusive control of areas in a page by a system comprising means for storing the position of the trailing end of a tuple in a page and means for executing an improved compaction, wherein the size of the vacant area and the position of the trailing end of a tuple in the same page is updated at the time of storing the tuple, and the management information of an unoccupied area is updated when the unoccupied area is used for storing a tuple.

The first object may alternatively be achieved in the following manner. In the case where a given transaction increases the size of a vacant area in a page by deleting a tuple from the page or otherwise, the use of the vacant area in the same page is prevented by requesting exclusive control of the vacant area.

In the case where a given transaction requires the use of a vacant area other than the unoccupied area of the page due to the addition, update or the like process of a tuple, the usability of the vacant area in the same page is decided by reference to the requesting means so that the vacant area is used only when it is usable.

Subsequently when the transaction that has increased the vacant area in the page rolls back, the exclusive control and the improved compaction according to the invention are performed in case a tuple to be restored in the unoccupied area cannot be so added (described later). This improved compaction manages by combining a plurality of vacant areas into a single continuous vacant area, and other transactions (excepting the transactions in the process of roll back) are prevented from using the particular continuous vacant area. As a result, an area is secured which is required for rollback of the transaction that has increased the vacant area in the page.

Consequently, a tuple can be restored by rollback of a transaction without changing the physical identification number of the tuple. The result is that exclusive control of the page is effected only during the period when the page is being accessed thereby to improve the parallelism of the transaction processing.

The second object of the invention is alternatively achieved in the following manner. Specifically, consider the case in which there is a single transaction for a page that has increased the total size of vacant areas in the page and that the unoccupied area in the page is not sufficiently large to store a tuple to be added, although the size required for storing a tuple is secured by adding the size of the vacant areas to the unoccupied area. If a tuple can be added to the areas following the position of the trailing end of the tuples in the page, a tuple is added at the position of the trailing end of the tuples in the page. Otherwise, a tuple is added by use of the page management method according to the invention from the position of the trailing end of the tuples in the page after execution of the improved compaction. The vacant areas in the page thus can be effectively utilized.

In the aforementioned case, the vacant area of the page which has been increased by an active transaction can be used only by the particular transaction. After the process for increasing the vacant area, the transaction may consume the vacant area by adding a tuple or otherwise. The restoration in the rollback operation, however, is performed in the reverse order of the transaction. When a tuple is restored in the vacant area, therefore, the consumed area is restored, with the result that the area required for tuple restoration is secured. Consequently, a tuple can be restored without changing the physical identification number of the tuple in the rollback operation.

Further, the first object of the invention may alternatively be achieved in the following manner. In the case where a given transaction deletes a tuple from a page, the binary positional information of the deleted tuple set in the page is reversed from a positive to negative value to indicate the deleted state. In the process, the image of the deleted tuple remains unchanged. The same transaction requests exclusive control of the same tuple until complete operation of the transaction, and other transactions are thereby prevented from using the space of the same tuple.

In the case where all the vacant areas other than the unoccupied area of a page can be used when a given transaction adds a tuple, on the other hand, reference is made to the binary positional information of all the tuples secured in the same page. When the positional information of a tuple is negative in value, the image of the tuple indicated by the positional information is referenced. On the assumption that the sum of the length of the tuple stored in the particular tuple image and the unoccupied area is longer than the length of the tuple to be added, exclusive control of the stored tuple is requested. Once the request for exclusive control is granted, a tuple can be added using the area of a deleted tuple.

BRIEF DESCRIPTION OF THE DRAWINGS

FIG. 6 is a flowchart showing an example algorithm for performing the improved compaction.

FIGS. 16A to 16C are flowcharts showing an algorithm for updating a tuple.

DESCRIPTION OF THE PREFERRED EMBODIMENTS

Embodiments of the invention will be described with reference to FIGS. 1 to 28.

Figure 1:
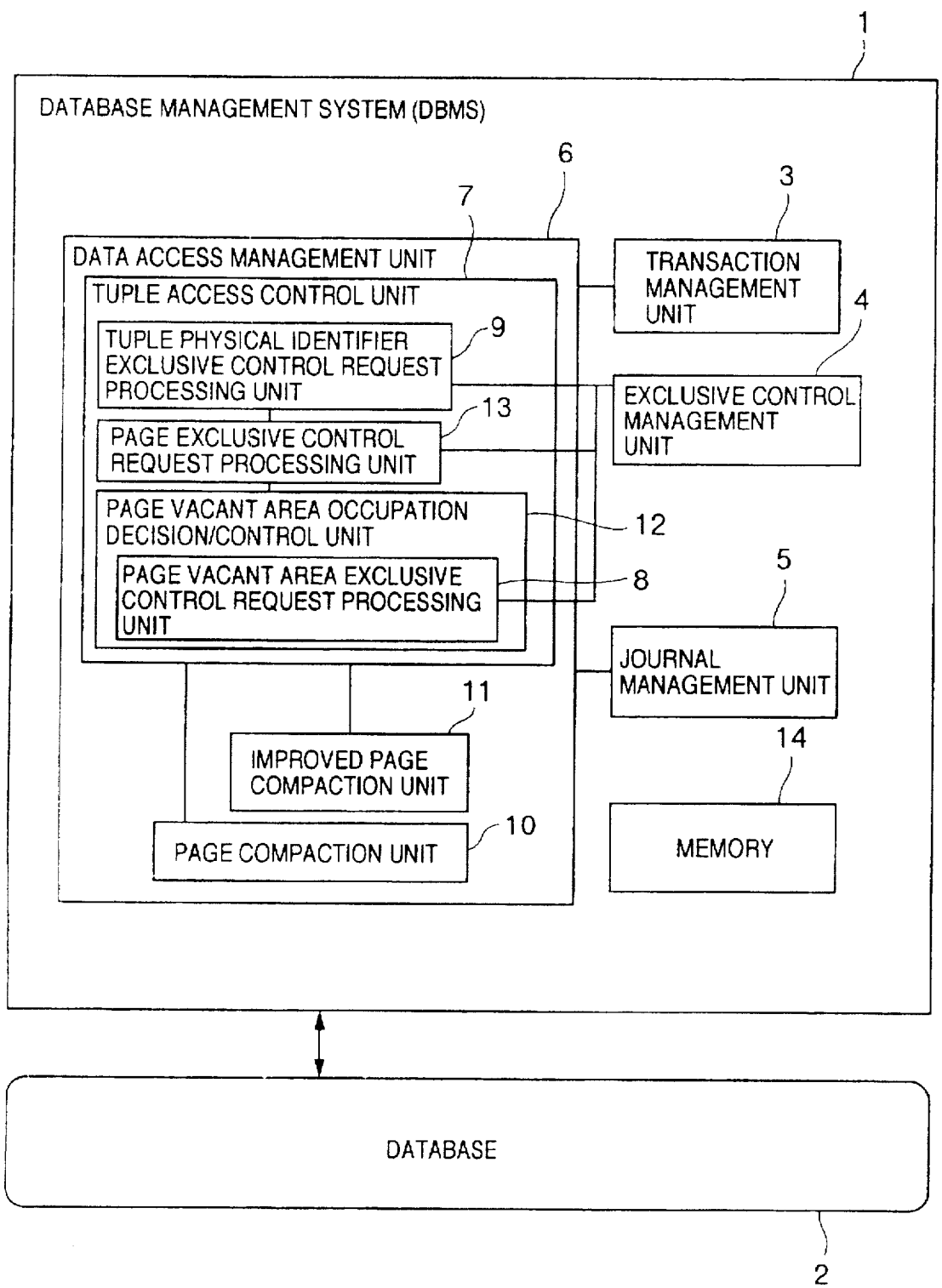
FIG. 1 is a block diagram showing an example system configuration.

A block diagram of a database management system embodying the invention is shown in FIG. 1. A database management system 1 for managing a database 2 includes a transaction management unit 3, an exclusive control management unit 4, a journal management unit 5 and a data access management unit 6.

A method for exclusive control of areas in a page according to the present invention, which is incorporated in the data access management unit 6, comprises a tuple access control unit 7, a page vacant area exclusive control notification unit 8, a tuple physical identifier exclusive control request processing unit 9, a page compaction unit 10, an improved page compaction unit 11, a page vacant area occupation decision/control processing unit 12 and a page exclusive control request processing unit 13.

According to this embodiment, the tuple exclusive control request processing unit 9, the vacant area occupation decision/control processing unit 12 and the page exclusive control request processing unit 13 are realized as a part of an algorithm used for the tuple access control unit 7. The page vacant area exclusive control request processing unit 8, on the other hand, is realized as a part of an algorithm for the vacant area occupation decision/control processing unit 12.

The page compaction unit 10 and the improved page compaction unit 11 are called as required by the tuple access control unit 7. The request for exclusive control issued by the tuple exclusive control request processing unit 9, the page exclusive control request processing unit 13 or the page vacant area exclusive control request processing unit 8 is managed by the exclusive control management unit 4. Also, the journal for which an acquisition request is issued from the data access management unit 6 at the time of tuple addition, deletion or update is acquired through the journal management unit 5.

First, a data structure used according to an embodiment of the invention will be described.

Figure 2:
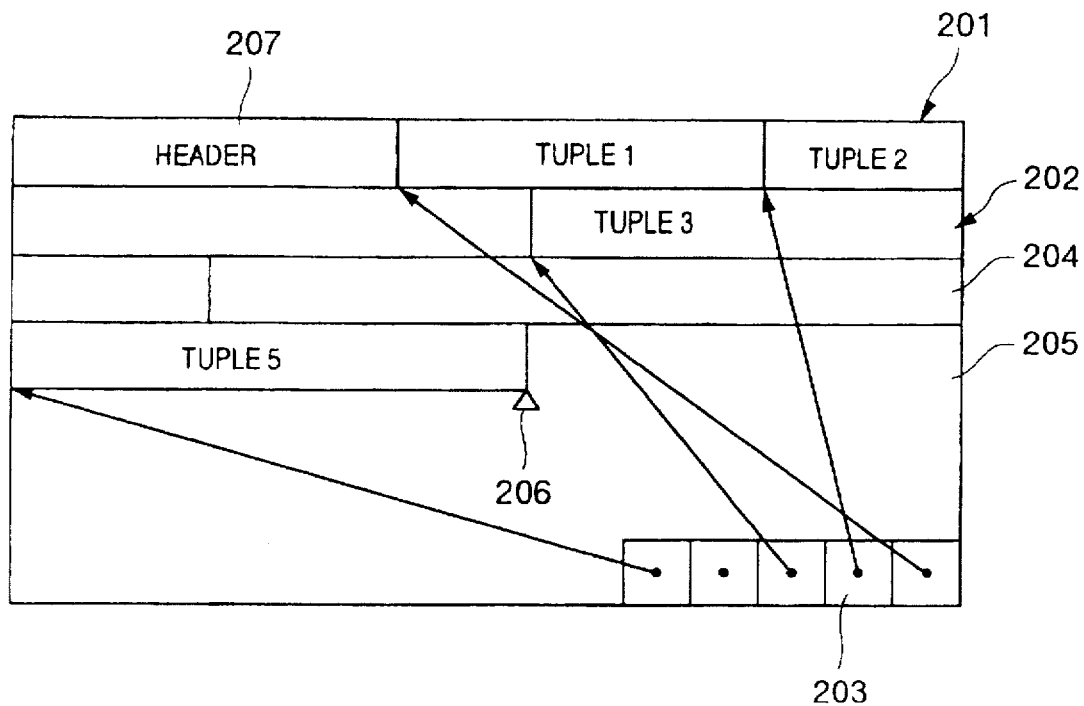
FIG. 2 is a diagram showing an example of tuple management in a page.

An example page structure is shown in FIG. 2. A page 201 includes a tuple 202 and slots 203. Each slot stores the position of a tuple indicated by the particular slot in the page, and each tuple is uniquely identified by the page number and the slot number (hereinafter referred to as "the physical identification numbers"). A tuple is added in the positive direction of address (incremental direction), and a slot in the negative direction of address (decremental direction). A page group is stored in the data base 2, and several pages are read into a memory 14 as required.

The page control information indicating the internal condition of each page is managed by the page header 207. The information thus managed include a leading offset 206 of an unoccupied area 205, the size of a vacant area 204 generated when a tuple is deleted or reduced in length, the maximum slot number assigned to the page and the number of slots in use. These data are initialized by the tuple access unit when a page is newly assigned, and updated at the time of tuple addition, deletion or updating. Also, in the case where a page is compacted during these processes, the data are updated by the page compaction unit 10 or the improved page compaction unit 11.

Figure 3:
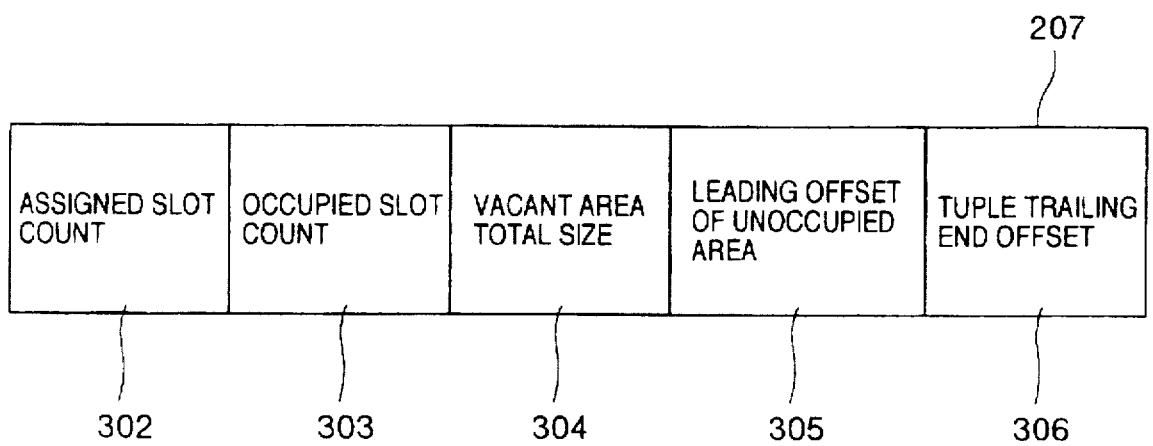
FIG. 3 is a diagram showing an example structure of the page header.

An example of page control information 207 is shown in FIG. 3. The page control information 207 includes an in-page assigned slot count management field 302, an active slot count management field 303, a vacant area total size management field 304, an unoccupied area leading offset management field 305 and a tuple trailing end offset management field 306. The tuple trailing end offset is a leading offset of a vacant area adjacent to an unoccupied area, and in the absence of a vacant area adjacent to an unoccupied area, has a value equal to that of the leading offset of the unoccupied area.

At the time of page initialization, the assigned slot count 302, the active slot count 303 and the vacant area total size 304 are set to zero, while the unoccupied area leading offset 305 and the tuple trailing end offset 306 are initialized to the length of the header 207.

The assigned slot count 302 is updated by the tuple access control unit 7 at the time of tuple addition or deletion, and by the page compaction unit 10 at the time of page compaction. The assigned slot count 302 is thus referenced by the page compaction unit 10, the improved page compaction unit 11 and the tuple access control unit 7. The active slot count 303 is referenced and updated by the tuple access control unit 7. The vacant area total size 304 and the unoccupied area leading offset 305 are updated by the tuple access control unit 7 and the page compaction unit 10, and referenced by the tuple access control unit 7. The tuple trailing end offset 207 is updated by the tuple access control unit 7 and the page compaction units 10, 11 and referenced by the tuple access control unit 7.

Now, an algorithm used in the invention is described. A page can be locked also by use of a semaphore. The request for fixing or releasing a page on the memory is assumed to be performed at the time of page lock request or unlock request respectively.

Figure 4:
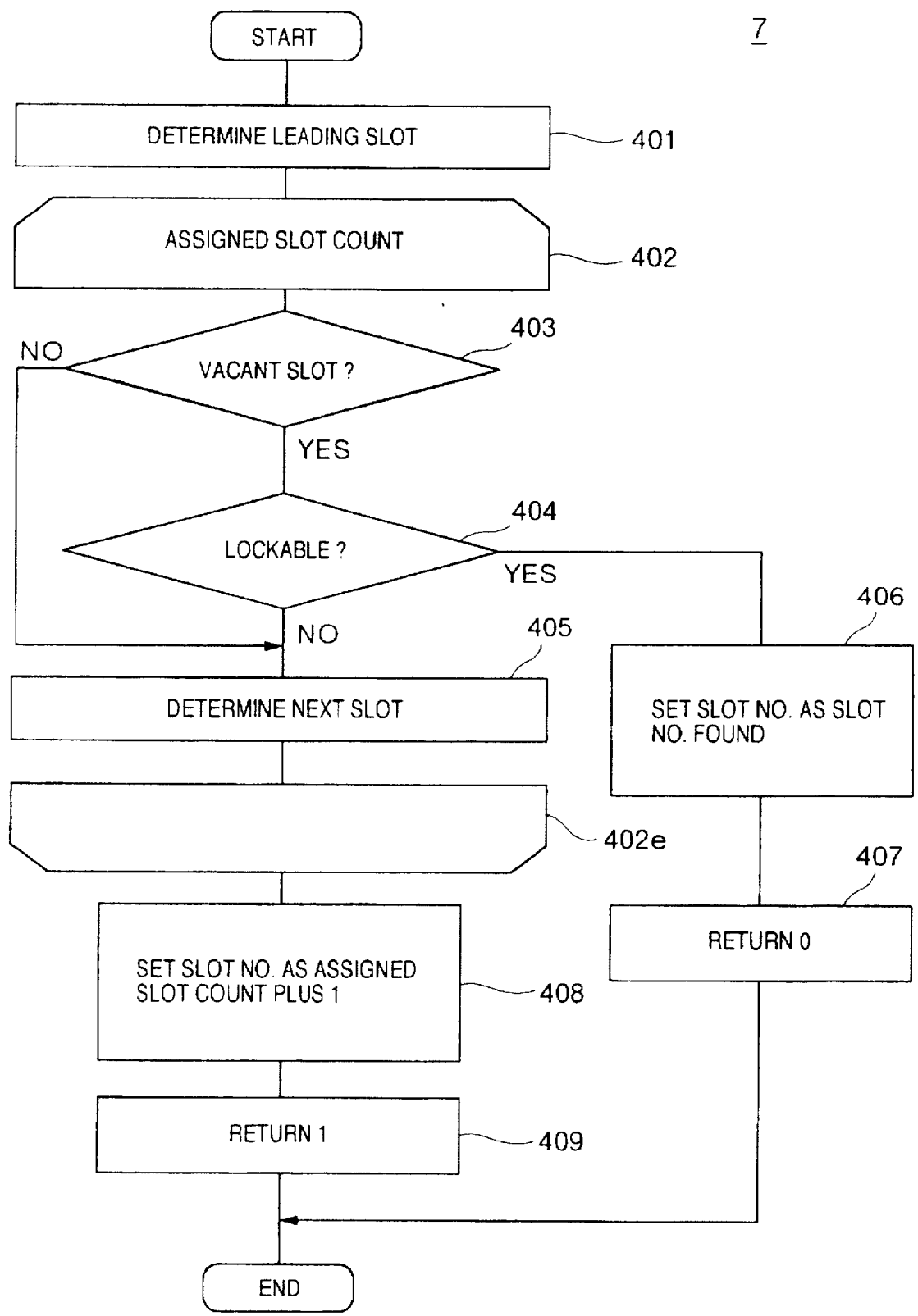
FIG. 4 shows a flowchart of an example algorithm for searching for a slot used for adding a tuple.

FIG. 4 shows an algorithm for determining a slot for adding a tuple at the time of tuple addition. This algorithm is executed at the tuple access control unit 7. Step 401 determines a leading slot, and step 402 loops by the number equivalent to the assigned slot count to determine a usable slot. Step 403 decides whether the particular slot is vacant (the value of the slot, if vacant, is −1). In the case where a slot is vacant, the possibility of exclusive locking (hereinafter referred to as "X lock") of the slot is tested to check to see whether the particular slot is vacant due to a specified state (for example, updating of a corresponding tuple) (step 404). In the case where locking is possible, the particular slot is in a specified state. The slot number for tuple addition is set to the related slot number (step 406), and the process is returned with a return value of 0 (step 407). In the case where the answer at steps 403 and 404 is NO, the next slot is determined (step 405) and another loop is carried out (step 402e). The processes including steps 402 through 402e are repeated until the condition indicated by step 402 is satisfied. Steps 402 and 402e constitute a pair, indicating that the steps between the pair are iterated by the assigned number of slots.

In the case where a slot for tuple addition cannot be determined after investigation of all assigned slots, the slot number for tuple addition is set to an assigned slot count +1 (step 408), with the process returned with a return value of 1 (step 409).

Figure 5:
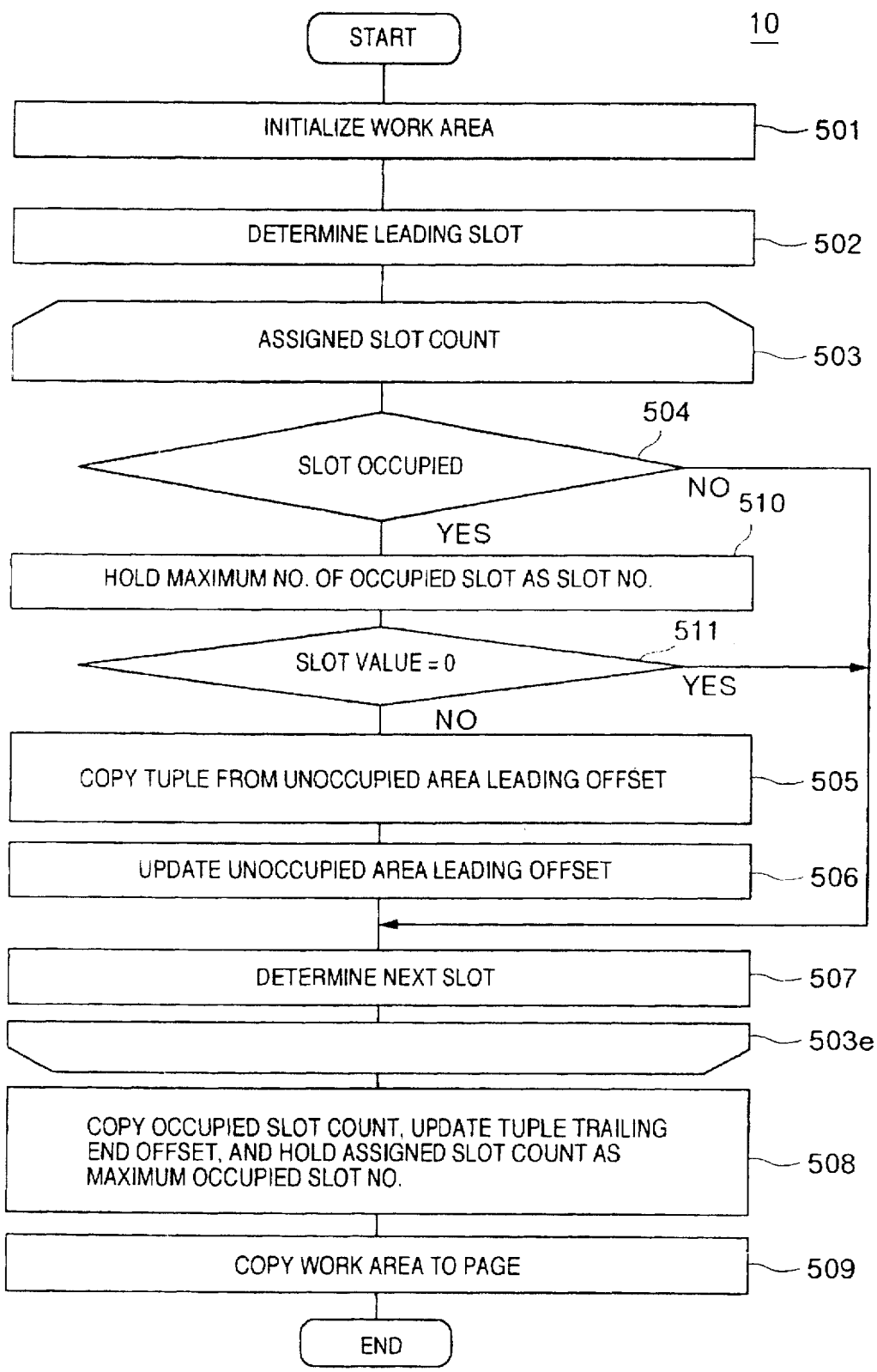
FIG. 5 is a flowchart showing an example algorithm for performing the compaction.

A normal compaction algorithm executed by the page compaction unit 10 is shown in FIG. 5. First, the work area is initialized (step 501). Then a leading slot is determined (step 502), and after the leading offset of the unoccupied area is located immediately after the header, looping is conducted the number of times equivalent to the assigned slot count (step 503). Step 504 decides whether a slot is in use or not, and if it is in use (when the slot value is not −1), the present slot number is held as a maximum occupied slot number (step 510). Decision is then made as to whether the slot value is zero or not (step 511), and if it is not zero, the tuple is copied from the leading offset of the unoccupied area of the work area (step 505) while updating the leading offset of the unoccupied area of the work area (step 506). After that, the next slot is determined (step 507). Upon completely copying all the tuples (step 503e), the occupied slot count, the assigned slot count and the tuple trailing end offset of the work area are updated (step 508) and the contents of the work area are copied to the page (step 509).

FIG. 6 shows an algorithm for the improved compaction executed by an improved page compaction unit 11 which constitutes one of the features of the invention. The difference with the algorithm shown in FIG. 5 is that the leading offset of the unoccupied area and the assigned slot count are not changed. The improved compaction is implemented in the following manner. First, the work area is initialized (step 601). Then, the leading slot is determined (step 602), and the tuple trailing end offset is set immediately after the header, after which the looping is effected the number of times equal to the assigned slot count (step 603). Step 604 decides whether a slot is in use or not, and if it is in use, the tuple is copied from the leading offset of the unoccupied area of the work area (step 605). The tuple trailing end offset of the work area is then updated (step 606), and the next slot is determined (step 607). Upon complete copying of all tuples (step 603e), the occupied slot count and the leading offset of the unoccupied area of the work area are updated (step 608), and the contents of the work area are copied to the page (step 609).

The tuple trailing end offset value can be determined by calculations without using the section 306. In the case where the tuple last offset section 306 shown in FIG. 3 is not used, the compaction and the improved compaction described above require no maintenance of the tuple trailing end offset section. Also, with the improved compaction, a variable representing the position of the tuple trailing end is held within the program and appropriately processed in place of the tuple trailing end offset.

Figure 7A:
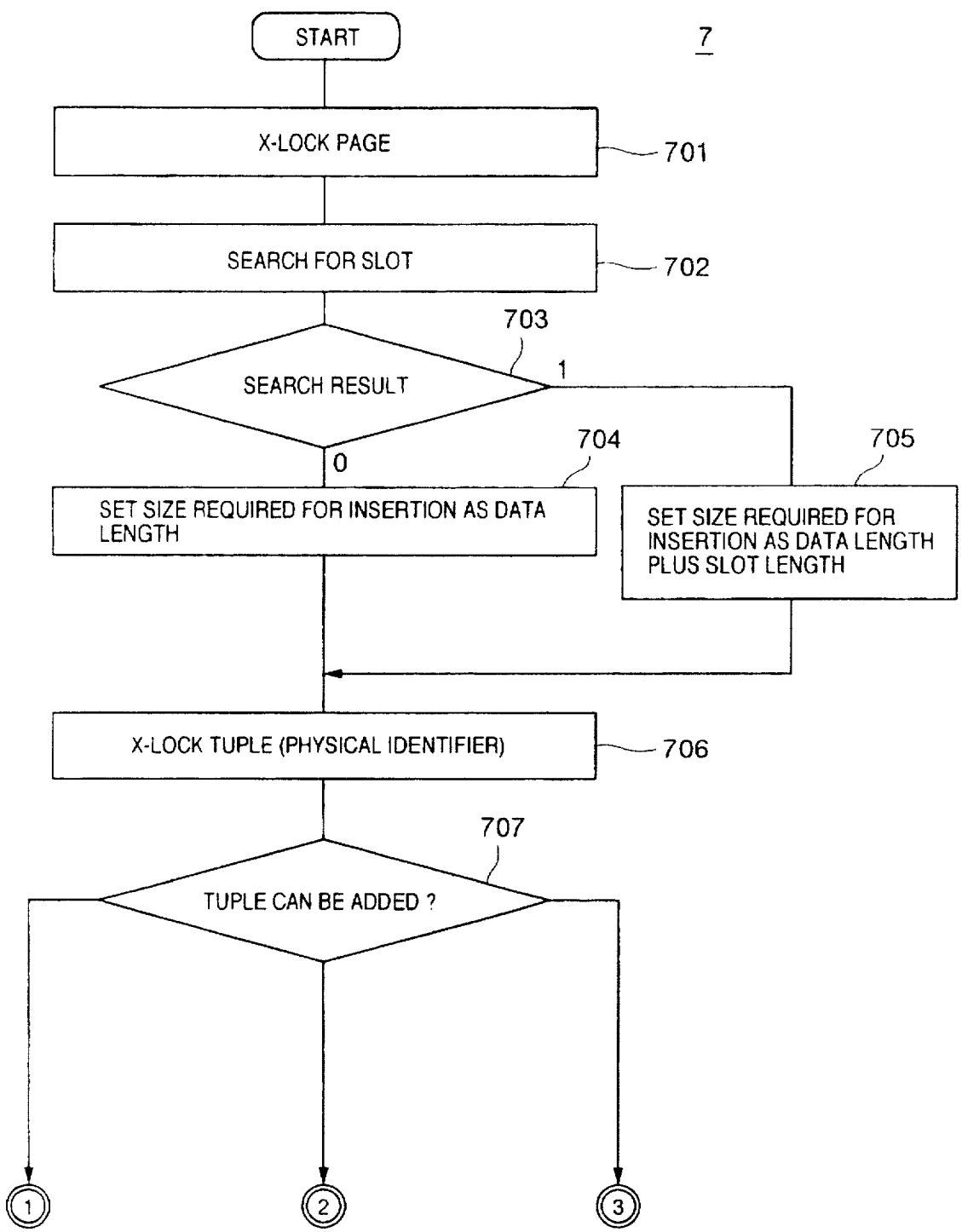
FIGS. 7A to 7C are flowcharts showing an example algorithm for adding a tuple.
Figure 7B:
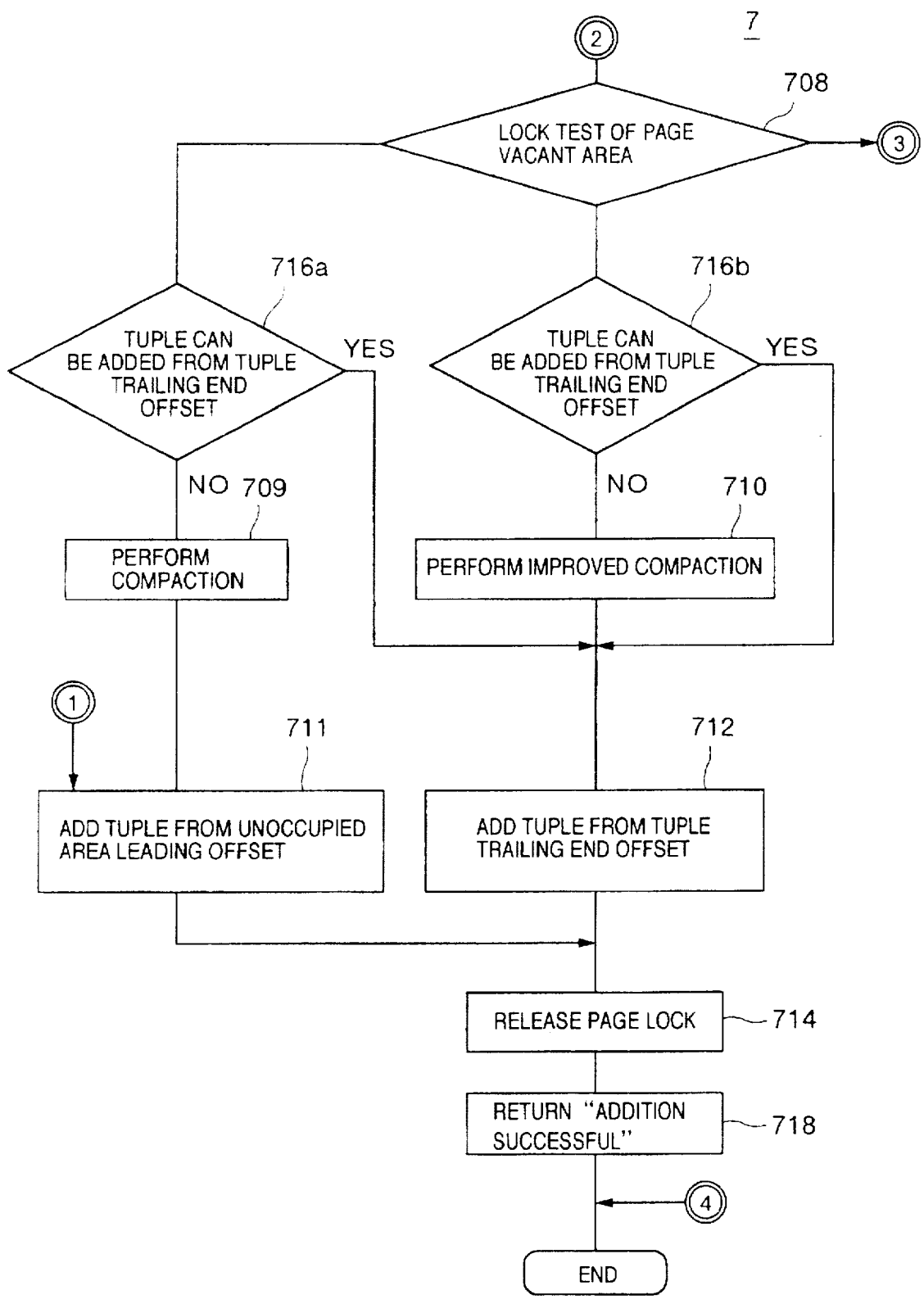
Figure 7C:
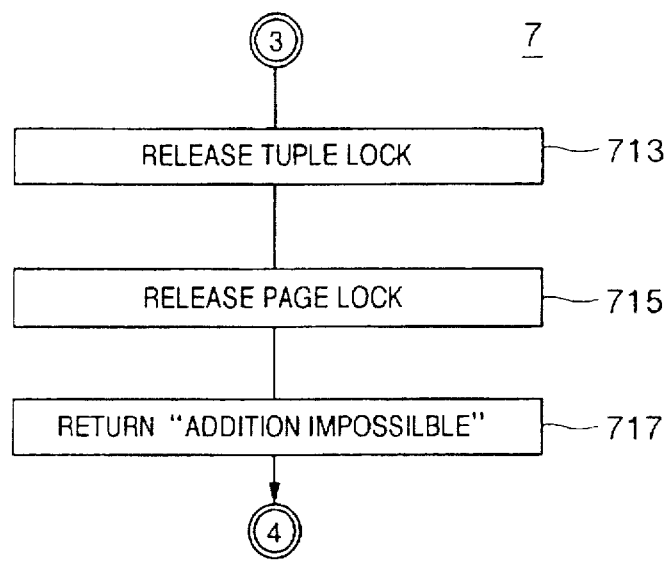

FIGS. 7A to 7C show an algorithm for adding a tuple. This algorithm is executed by the tuple access control unit 7. In this algorithms, step 701 corresponds to the page exclusive control request processing unit 13, step 706 to the tuple exclusive control request processing unit 9, steps 707 and 708 to the vacant area occupation decision/control processing unit 12, and step 707 to the page vacant area exclusive control request processing unit 8.

First, a page to which a tuple is to be added is subjected to X lock at step 701. A slot is then determined by the slot search algorithm shown in FIG. 4 (step 702). The result of slot search is decided (step 703), and the data length required for insertion is determined (steps 704, 705).

The physical identifier of the tuple added at step 706 is X-locked, and step 707 decides whether the tuple can be added to the page. In the case where the tuple can be added, the tuple is added from the leading offset of the unoccupied area of the page (step 711). In the process, the unoccupied area leading offset and the tuple trailing end offset are both updated.

Consider the case in which a tuple can be added if compaction is carried out. First, an X-mode lock test is conducted on vacant areas of the page (step 708). If the lock is possible, step 716a decides as to whether a tuple can be added from the tuple trailing end offset. If a tuple cannot be so added, the compaction shown in FIG. 5 is carried out (step 709), and a tuple is added from the leading offset of the unoccupied area of the page (step 711). In the case where step 716a decides that a tuple can be added, a tuple is added from the tuple trailing end offset (step 712).

Assume, on the other hand, that only a self-transaction locks the vacant area of the same page. Step 716b decides whether a tuple can be added from the tuple trailing end offset, and if the tuple cannot be so added, the improved compaction shown in FIG. 6 is carried out (step 710). A tuple is thus added from the tuple trailing end offset (step 712). In the case where tuple addition is possible without the improved compaction, on the other hand, the step for carrying out the improved compaction is skipped, and a tuple is added from the tuple trailing end offset. When adding a tuple from the tuple trailing end offset, first, the trailing end offset is updated. Only in the case where the trailing end offset after adding a tuple exceeds the leading offset of the unoccupied area, the leading offset of the unoccupied area is made equal to the tuple trailing end offset.

After a tuple is added, the page is unlocked (step 714), and a signal "addition successful" is returned (step 718). In the case where step 707 decides that a tuple cannot be added to the page even after compaction or in the case where step 708 reveals that another transaction locks the vacant area of the page, on the other hand, the locking executed at step 706 and the locking of the page are released (steps 713, 715), and a signal "tuple addition impossible" is returned (step 717).

As described above, the tuple trailing end offset value can be determined by calculations without using the section 306. In the case where the tuple trailing end offset section 306 in FIG. 3 is not used, steps 717 and 718 are eliminated. Also, the same processing as that where the "tuple addition impossible" signal is returned is carried out in the case where the locking test of the page vacant area (step 708) shows that the locking is effected only by the same transaction (steps 710 and 712 become unrequited). Further, the updating of the tuple trailing end offset becomes unrequited.

Figure 16B:
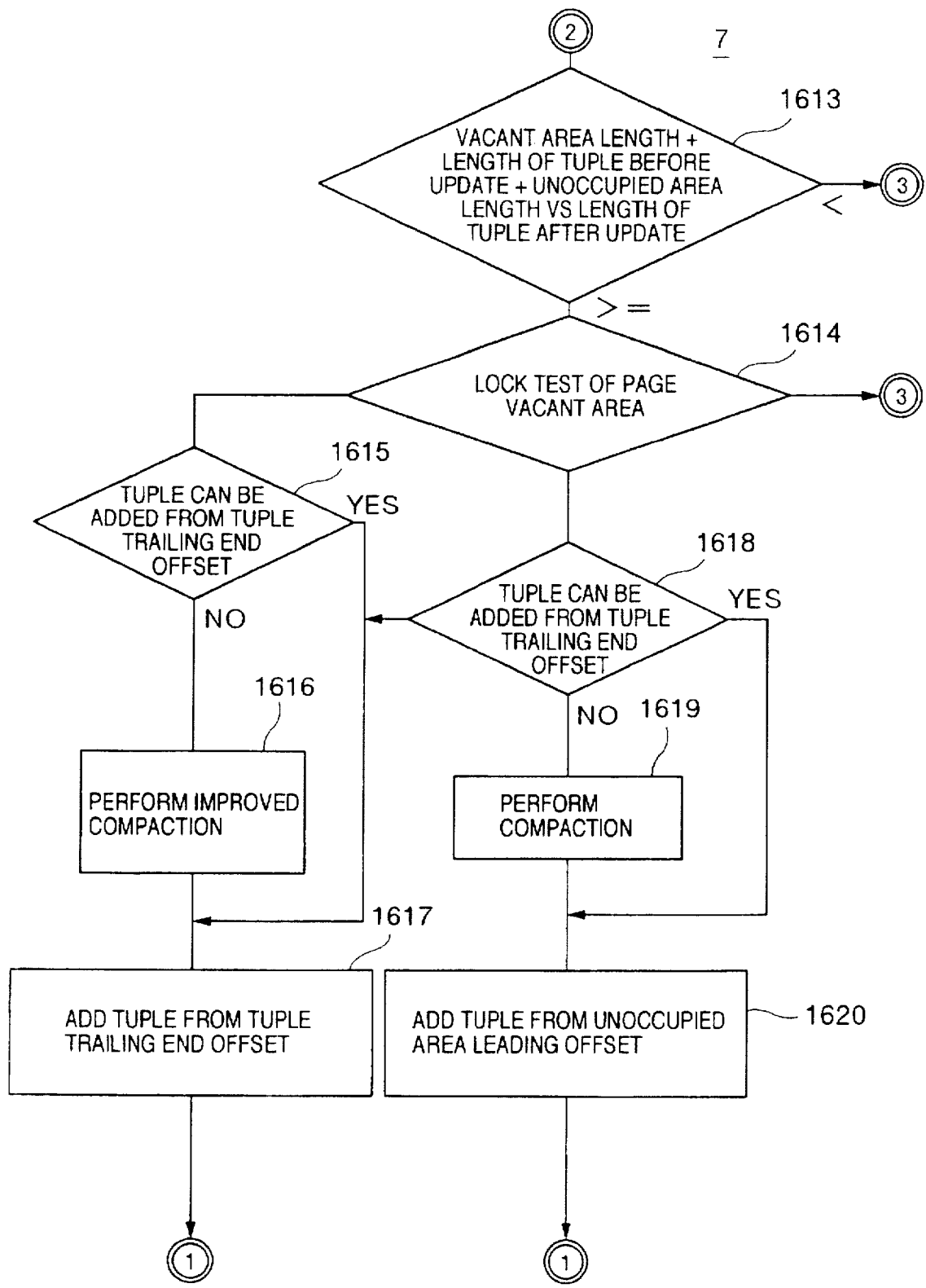
Figure 16C:
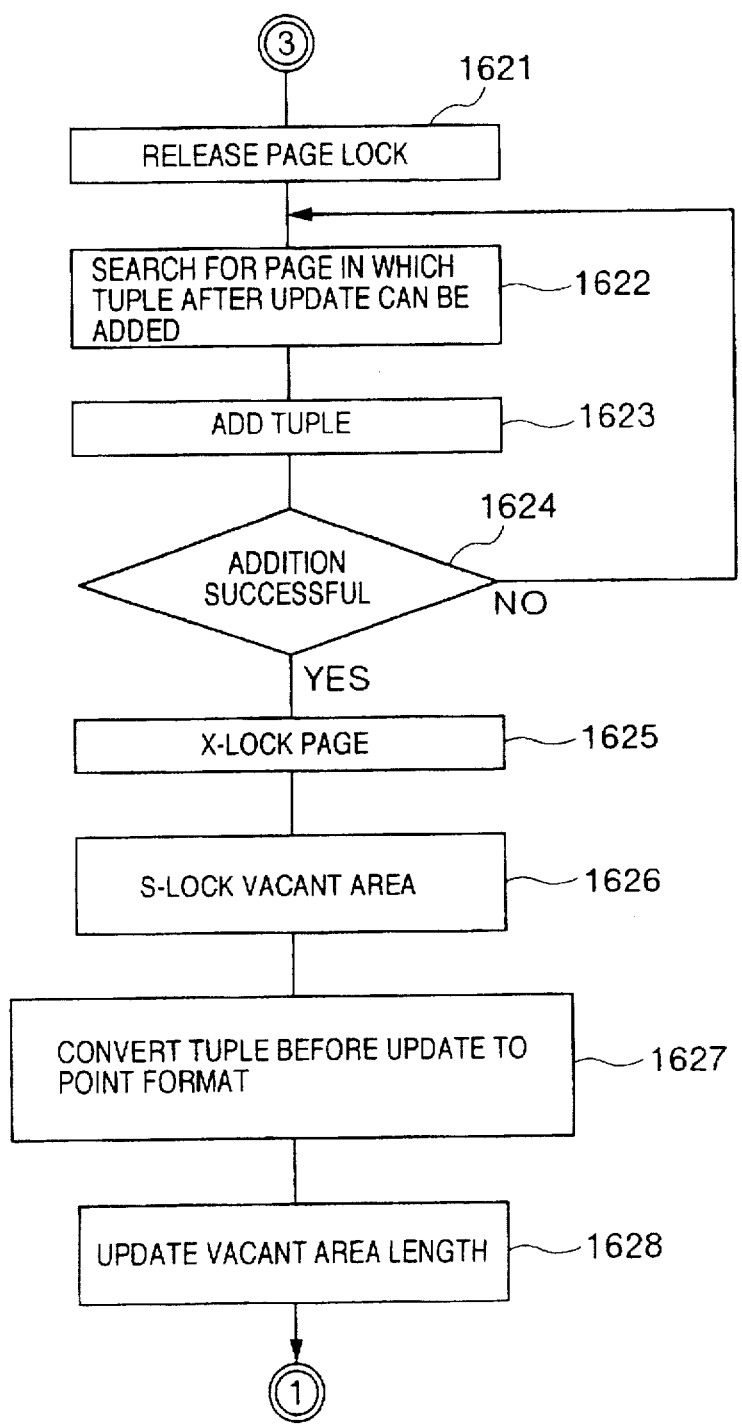

FIGS. 16A to 16C show an algorithm for updating a tuple. This algorithm, like the algorithm for adding a tuple, is also executed by the tuple access control unit 7. Step 1601 corresponds to the tuple exclusive control request processing unit 9, step 1602 to the page exclusive control request processing unit 13, steps 1606 and 1614 to the page vacant area exclusive control request processing unit 8, and steps 1603, 1606, 1609, 1613 and 1614 to the vacant area decision/control processing unit 12, respectively.

First, a physical identifier of a tuple is subjected to X locking (step 1601). The tuple locking, however, is not required when the tuple to be deleted is X-locked at the time of search. Then the page having the tuple is X-locked (step 1602), and the tuple lengths before and after update are compared with each other (step 1603).

In the case where the tuple lengths before and after update are equal to each other, the tuple after update is overwritten on the position of the tuple before update (step 1604), and the page is unlocked (step 1605).

If the tuple length before update is shorter than that after update, in contrast, the vacant area of the page is secured by shared locking (hereinafter referred to as S-locking) (step 1606), and the tuple after update is overwritten on the position of the tuple before update (step 1607). Further, the difference between the tuple lengths before and after update is added to the length of the vacant area of the particular page. In the case where the trailing end position of the tuple before update is identical to the tuple trailing end position, the tuple trailing end offset is updated (step 1608).

When the tuple length after update is longer than that before update, the tuple length after update is compared with the unoccupied area (step 1609). In the case where the tuple length after update is equal to or shorter than the length of the unoccupied area, on the other hand, the tuple after update is added from the leading offset of the unoccupied area (step 1610), the length of the tuple before update is added to the length of the vacant area, the unoccupied area leading offset and the tuple trailing end offset are updated (step 1611), and the slot value indicating the tuple before update is changed to the head of the added tuple after update (step 1612).

In the case where the tuple length after update is longer than the unoccupied area length of the page, the sum of the vacant area length, the tuple length before update and the unoccupied area length is compared with the tuple length after update (step 1613). When the former is shorter than or equal to the latter, the page vacant area occupation lock test is conducted (step 1614). When the result shows that only the transaction identical to the transaction for which the tuple is to be updated is locked, decision is made as to whether a tuple can be added from the tuple trailing end offset (step 1615). If such a tuple cannot be added, the slot value indicating the tuple is set to −1 and the improved compaction is effected (step 1616). In an improved compaction, the leading offset value of the unoccupied area is kept unchanged while existing vacant areas are combined into a continuous vacant area, which may be added to the trailing end tuple of the last one of compacted tuples.

After that, a tuple is added from the tuple trailing end offset to update the vacant area length, the unoccupied area length and the tuple trailing end offset (step 1617).

In the case where the result of step 1614 shows that the locking is possible, decision is made as to whether a tuple can be added from the tuple trailing end offset (step 1618). If tuple addition is impossible, compaction is done with the slot value indicating a tuple set to zero (step 1619), and a tuple is added from the leading offset of the unoccupied area, so that the unoccupied area length, the vacant area length and the tuple trailing end offset are updated (step 1620). If the decision at step 1618 shows that addition is possible, step 1617 is executed.

Assume that the tuple length after update is found longer at step 1613 or locking is found impossible at step 1614, the particular page is released from the locking (step 1621). And the page to which a tuple after update can be added is searched for (step 1622), and taking advantage of the tuple add algorithm described above, an attempt is made to add the tuple after update to the page defined at step 1622 (step 1623). The result of tuple addition attempt is examined and if it shows a failure, the process returns to step 1622, while if the attempt is successful, the page having the updated tuple unlocked before is X-locked again (steps 1624 and 1625). The vacant area of the page is S-locked (step 1626), and the tuple before update is converted into a point format (step 1627). If required as with the update of the vacant area length or step 1608, the tuple trailing end offset is updated (step 1628).

As described above, in the case where the tuple trailing end offset section 306 shown in FIG. 3 is not used, the update of the tuple trailing end offset becomes unrequited. Also, in the case where only the same transaction is locked as a result of the page vacant area lock test (step 161) as in the case of addition, the same process is performed as when the test result is that the locking is impossible. Further, steps 1615, 1618, 1616 and 1617 become unrequired.

Figure 8:
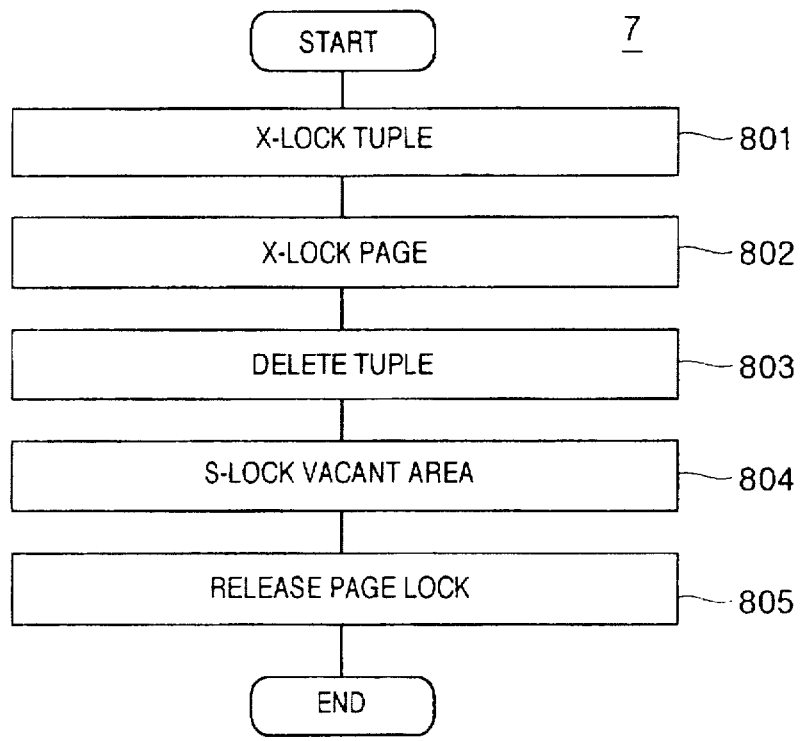
FIG. 8 is a flowchart showing an example algorithm for deleting a tuple.

A tuple deletion algorithm is shown in FIG. 8. This algorithm is also executed at the tuple access control unit 7 like the update or add algorithm. Step 801 corresponds to the tuple exclusive control request unit 9, step 802 to the page exclusive control request unit 13, and step 804 to the vacant area occupation decision/control unit 12 and the page vacant area exclusive control request unit 8, respectively.

In FIG. 8, first, the tuple physical identifier is X-locked (step 801). The tuple need not be locked if a tuple to be deleted is X-locked at the time of search. Then the page having the tuple is X-locked (step 802). The tuple is deleted at step 803, the vacant areas of the page are subjected to a shared locking (hereinafter referred to as S-locking) (step 804). At the last step, the page lock is released (step 805). As described above, in the case where the tuple trailing end offset section 306 is not used, the update of the tuple trailing end offset is not required.

Now, algorithm for the rollback processing will be explained. According to this embodiment, it is assumed that the rollback processing is carried out in the reverse order to the processing for tuples. The rollback algorithm is executed entirely at the tuple access control unit 7.

Figure 9:
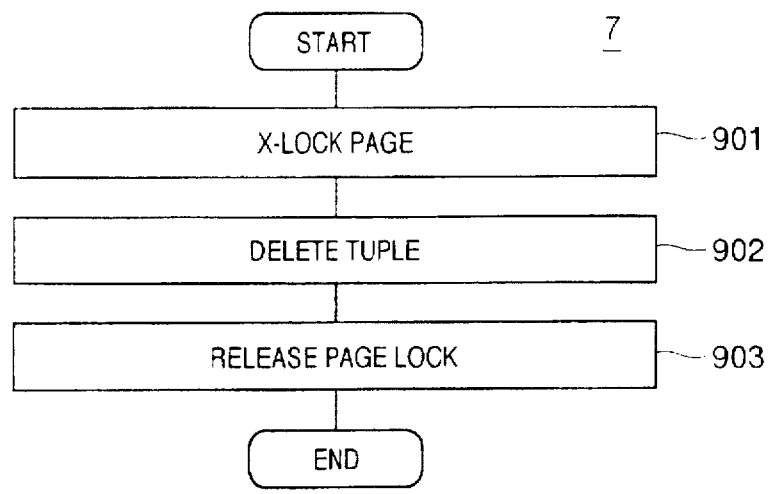
FIG. 9 is a flowchart showing an example algorithm of roll back for adding a tuple.

FIG. 9 shows a rollback algorithm for adding a tuple. Step 901 corresponds to the page exclusive control request processing. A page having a tuple is locked (step 901), a tuple is deleted (step 902), and then the page locking is released (step 903). In tuple deletion, the leading offset of the unoccupied area is not updated.

Figure 17:
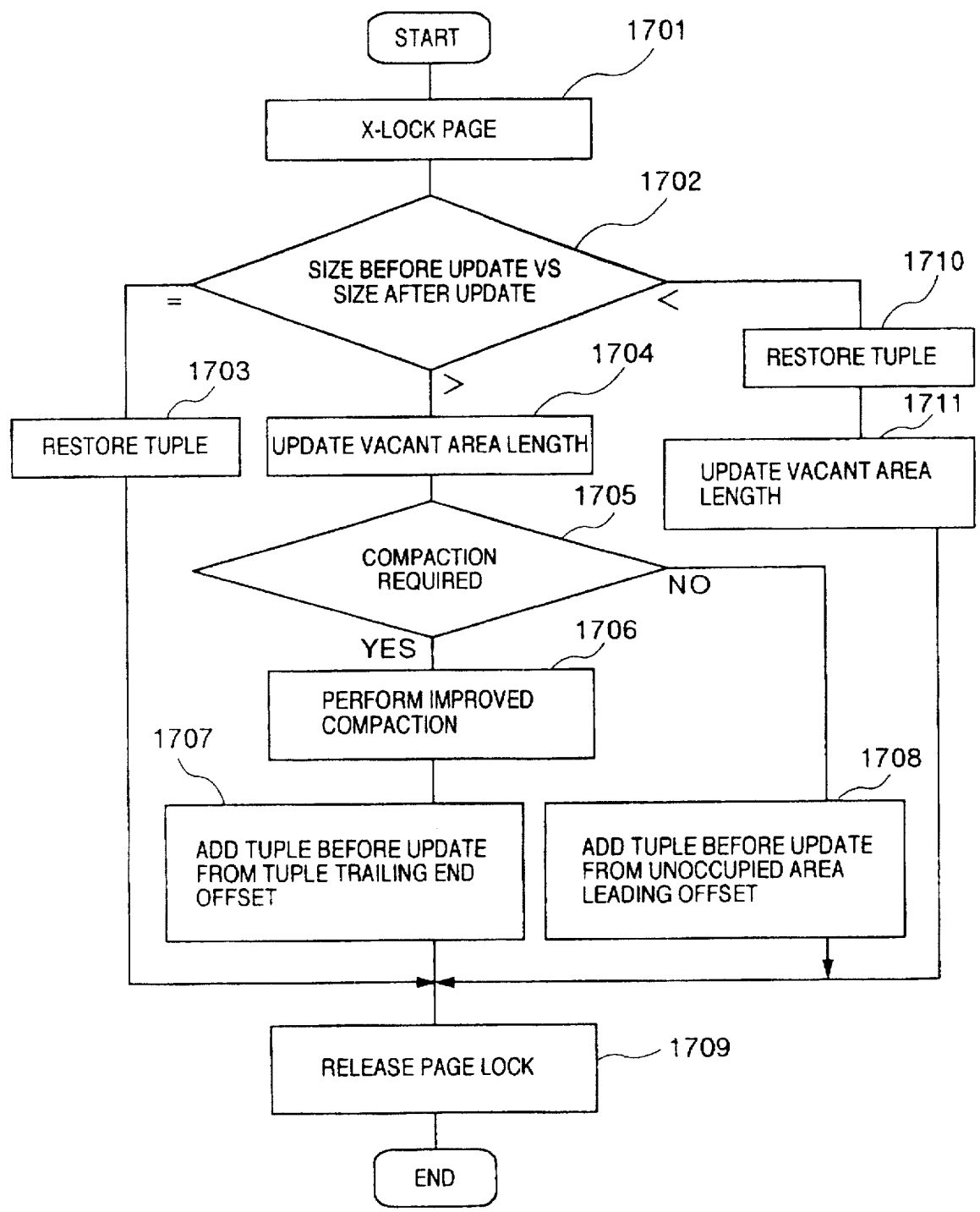
FIG. 17 is a flowchart showing an algorithm of roll back for updating a tuple.
Figure 18:
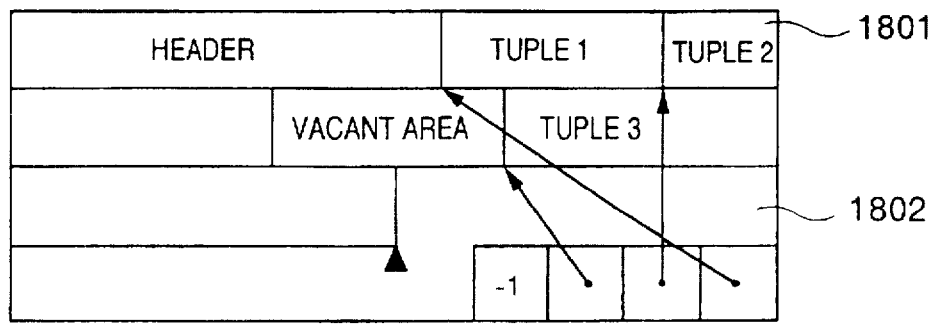
FIGS. 18 to 23 show examples of updating a tuple.

FIG. 17 shows a rollback algorithm for updating a tuple. Step 1701 corresponds to the page exclusive control request processing unit 13, and step 1702 to the vacant area occupation decision/control processing unit 12.

First, the page to which a tuple is returned is X-locked (step 1701). Then, the length of the tuple before update (the tuple returned to the page as a result of roll back) is compared with the length of the tuple after update (the tuple deleted from the page as a result of rollback) (step 1702).

In the case where the lengths of the tuple before update is equal to that of the tuple after update, the tuple before update is overwritten from the position of the tuple after update (step 1703).

When the tuple before update is shorter than the tuple after update, the tuple before update is overwritten from the position where the tuple after update exists (1710), and the length difference is added to the vacant area length. When the trailing end position of the tuple after update is the tuple trailing end offset, the tuple trailing end offset is also maintained (step 1711).

In the case where the length of the tuple before update is longer than that after update, in contrast, the tuple length after update is added to the vacant area length (1705), and decision is made as to whether compaction is required (step 1705). If such compaction is required, the slot value representing the tuple after update is set to −1 and the improved compaction is carried out (step 1706). Further, the tuple before update is added from the tuple trailing end offset and the required information is updated (step 1707).

In the case where compaction is not required, on the other hand, the tuple before update is added from the head of the unoccupied area to update the required information (step 1708), followed by releasing the locking of the page (step 1709).

In the case where the tuple trailing end offset section 306 is not used, the update of the tuple trailing end offset is not required. Also, in view of the fact that the trailing end of the tuple is determined by execution of the improved compaction (step 1706), step 1707 adds a tuple before update using the particular improved compaction.

Figure 10:
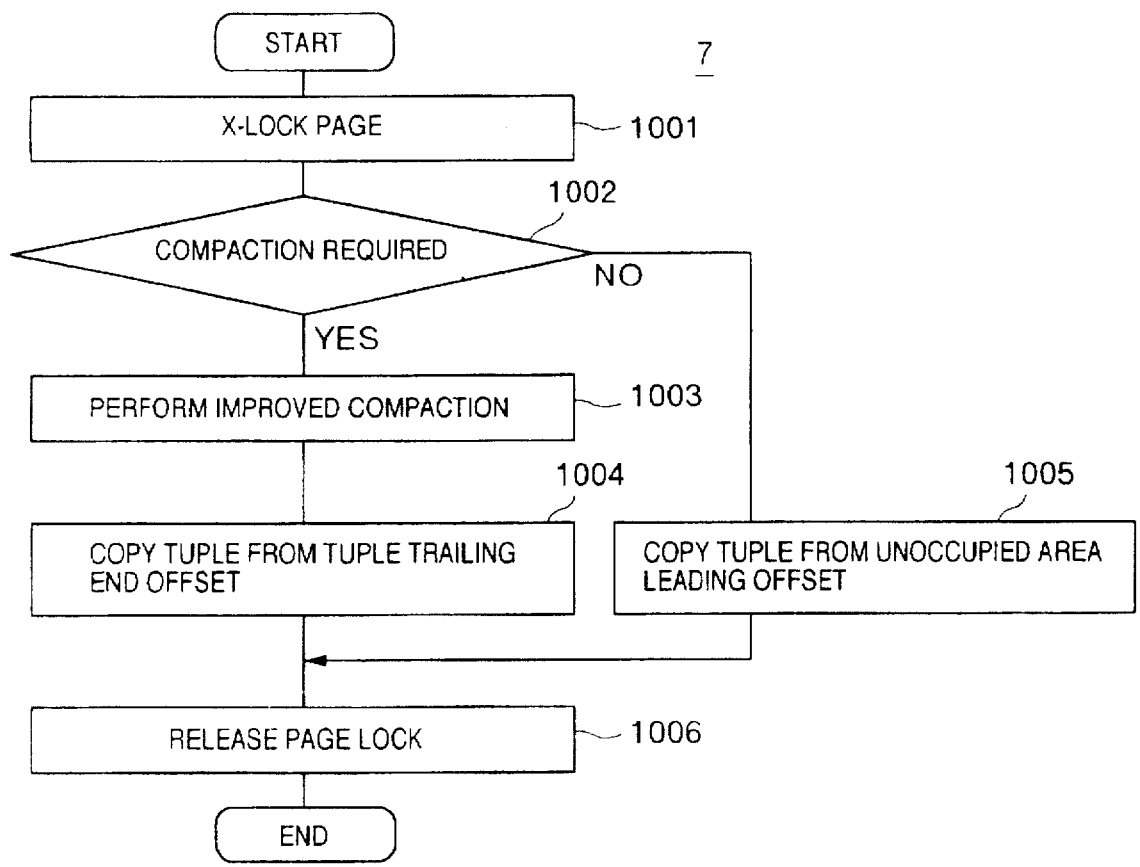
FIG. 10 is a flowchart showing an example algorithm of roll back for deleting a tuple.

FIG. 10 shows an algorithm for the rollback processing for tuple deletion. Step 1001 corresponds to the page exclusive control request processing unit 13.

First, the page to which the tuple is returned is X-locked (step 1001). Then, decision is made to see whether compaction is required (step 1002). If compaction is required, the improved compaction shown in FIG. 6 is carried out (step 1003), and a tuple is added from the tuple trailing end offset (step 1004). In the case where compaction is not required, on the other hand, a tuple is added from the leading offset of the unoccupied area (step 1005) and finally the page is released from locking (step 1006).

In the case where the tuple trailing end offset section 306 is not used, the tuple trailing end offset need not be updated. Also, since the trailing end of a tuple is determined by execution of the improved compaction (step 1003), step 1004 adds a deleted tuple by taking advantage of the improved compaction.

Now, explanation will be specifically made about the aforementioned various algorithms with reference to embodiments.

1. Examples of Tuple Addition and Deletion (FIG. 11)

Figure 11:
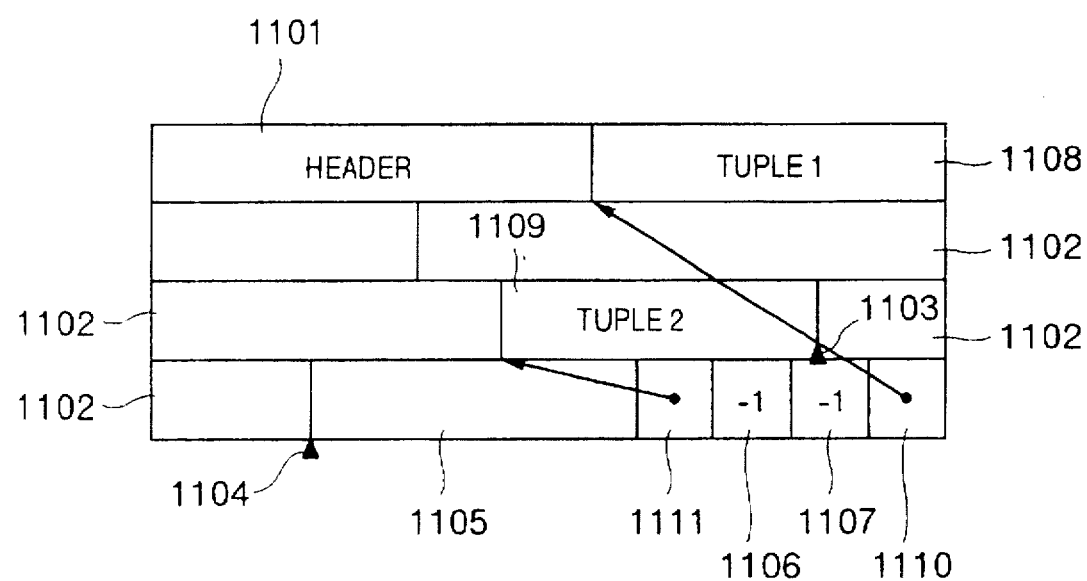
FIGS. 11 to 15 are diagrams showing an example page used in the embodiments of the invention.

An example page used in the present embodiment is shown in FIG. 11. Numerals 1108 and 1109 designate a tuple stored in the page, numeral 1102 a vacant area, and numeral 1105 an unoccupied area. Numeral 1101 designates a page header for storing the information shown in FIG. 3. In this example, the assigned slot count is 4, the occupied slot count is 2, the leading offset of the unoccupied area is at the position designated by 1104, and the tuple trailing end offset is at the position indicated by 1103 in FIG. 11. The size of the vacant area of the page is the total sum of the size designated by 1102. Numerals 1106, 1107, 1110 and 1111 designates slots, in which numeral 1110 designates the leading offset of tuple 1 (1108), and numeral 1111 the leading offset of tuple 2 (1109). Numerals 1106, 1107 designate slots not in use, that is, unoccupied slots both having a value of −1.

(1) Example 1 of Tuple Addition

First, with the page under the condition shown in FIG. 11, an example of tuple addition is shown for the case in which there exists no transaction that has increased the vacant area in the page.

For tuple addition, the algorithm shown in FIGS. 7A to 7C is executed. In this example, step 702 (the algorithm of which is shown in FIG. 4) having the algorithm shown in FIG. 7A enables the slot 1107 to add a tuple.

In the case where the size required for tuple addition is smaller than the unoccupied area (1105), step 707 decides that a tuple can be added without compaction, and therefore a tuple is added from the position indicated by 1104.

On the other hand, consider the case in which the size required for tuple addition is larger than the unoccupied area but smaller than the size from the tuple trailing end offset (1103) to the slot trailing end. Since the answer at step 718 is YES, a tuple is added from the tuple trailing end offset.

Also, assume that the size required for tuple addition is larger than the size from the tuple trailing end offset (1103) to the slot trailing end but is smaller than the sum of the total size of the vacant area 1102 and the size of the unoccupied area. It is possible to add a tuple to the particular page by effecting the page compaction shown in FIG. 5.

(2) Example 2 of Tuple Addition

Now, explanation will be made about an example of tuple addition with regard to the case where a transaction with a tuple deleted from slot 1107 is active. The transaction with a tuple deleted is assumed to be not equal to the transaction with a tuple to be added.

The algorithm shown in FIGS. 7A to 7C is used also in this case. Step 702 searches for a slot for which addition is possible (with the algorithm shown in FIG. 4). According to this embodiment, the answer at step 403 is YES but NO at the next step 404 for slot 1107 (as the slot is X-locked). Therefore, the slot constitutes no candidate slot for tuple addition, but the next slot 1106 makes a candidate slot for tuple addition.

In the case where the size required for tuple addition is smaller than the unoccupied area (1105), a tuple is added in the same manner as in case (1) mentioned above.

Consider the case, on the other hand, in which the size required for tuple addition is larger than the unoccupied area but smaller than the size from the tuple trailing end offset (1103) to the slot trailing end and also in which the size required for tuple addition is larger than the size from the tuple trailing end offset (1103) to the slot trailing end but smaller than the sum of the total size of the internal vacant area 1102 of the page to the unoccupied area size. In the example under consideration, the vacant area of the page is locked, and therefore the answer at step 808 is negative thereby deciding that tuple addition to the page is impossible.

(3) Example 3 of Tuple Addition

Explanation will be made about the tuple addition for the case in which a transaction attempting to add a tuple has already deleted a tuple stored in slot 1107 from the page.

In this case also, the algorithm shown in FIGS. 7A to 7C is used. After locking the page, step 702 determines a slot that can be added (according to the algorithm shown in FIG. 4). In this embodiment, the answer for the slot 1107 is YES at step 403, as in the following step 404 (Although the slot is X-locked, the transaction under X-lock is identical to the transaction subjected to lock test), and therefore the slot 1107 constitutes a slot to be added.

In the case where the size required for tuple addition is smaller than the unoccupied area (1105), a tuple is added in the same manner as in the cases (1) and (2) described above.

In the event that the size required for tuple addition is larger than the unoccupied area but smaller than the size from the tuple trailing end offset (1103) to the slot trailing end, the answer at step 719 is YES and therefore a tuple is added from the tuple trailing end offset.

Also, consider the case in which the size required for tuple addition is larger than the size from the tuple trailing end offset (1103) to the slot trailing end but smaller than the sum of the total size of the vacant area 1102 and the size of the unoccupied area in the page. It is possible to add a tuple from the tuple trailing end offset of the page by carrying out the improved compaction shown in FIG. 6.

(4) Example of Tuple Deletion

A specific example of deletion of tuple 2 (1109) indicated by slot 1111 will be explained with reference to the case of FIG. 11. A tuple is deleted using the algorithm shown in FIG. 8.

First, the physical identifier of a tuple is X-locked, the page having a tuple is determined, the page is locked, and thus the value of the slot 1111 is set to −1. Then, the tuple trailing end offset 1103 is updated. In the process, a slot having a maximum slot value is determined from all the slots in use, and the particular slot value plus the size of a tuple indicated by the slot is used as a new tuple trailing end offset.

After that, the size of tuple 2 deleted is added to the size of the vacant area, and the vacant area of the page is S-locked thereby to release the locking of the page.

Figure 20:
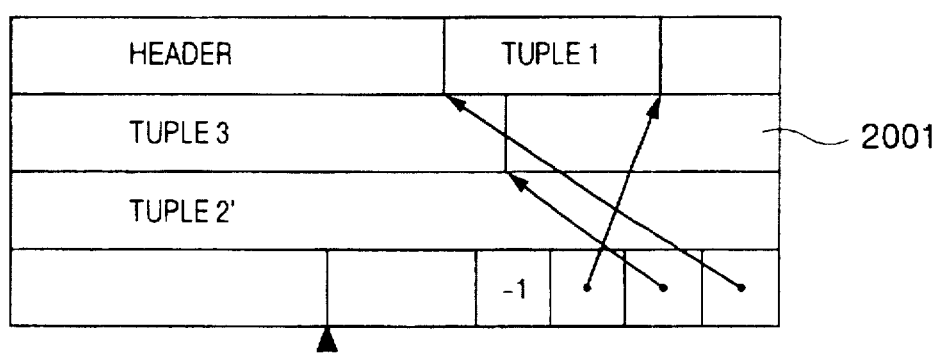
Figure 21:
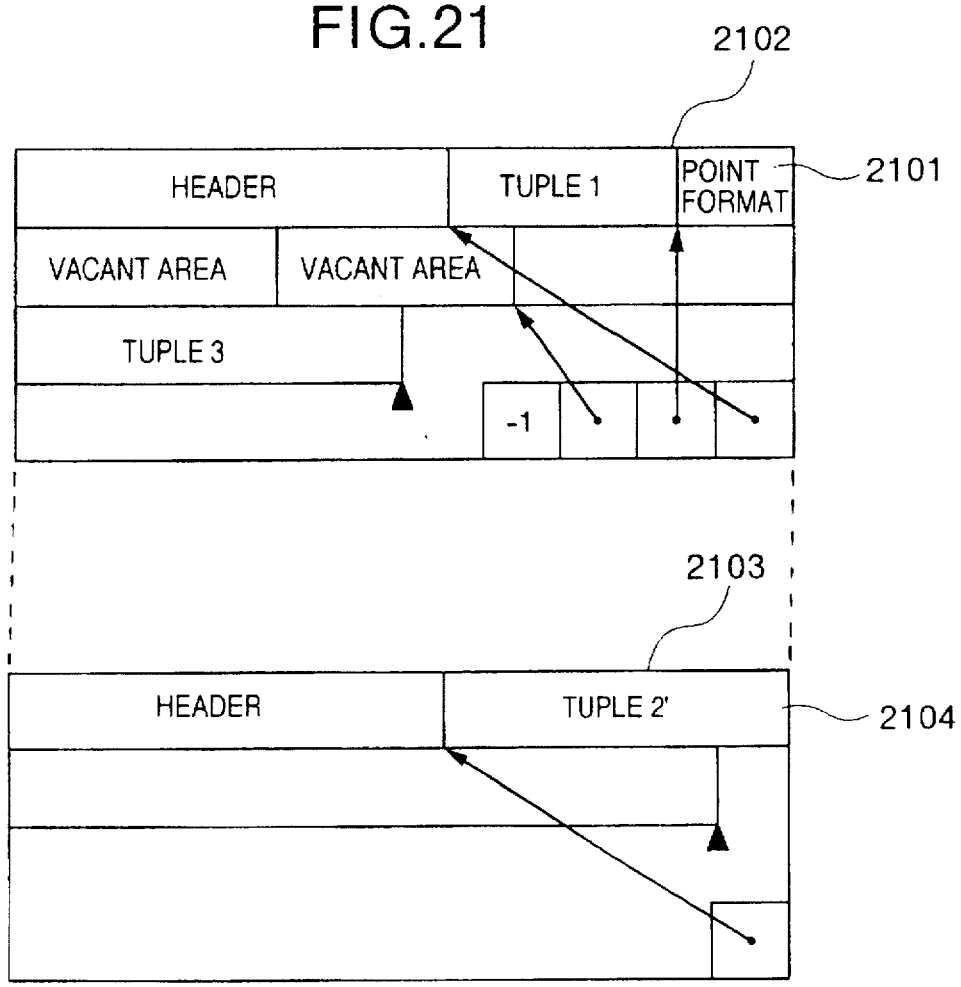
Figure 22:
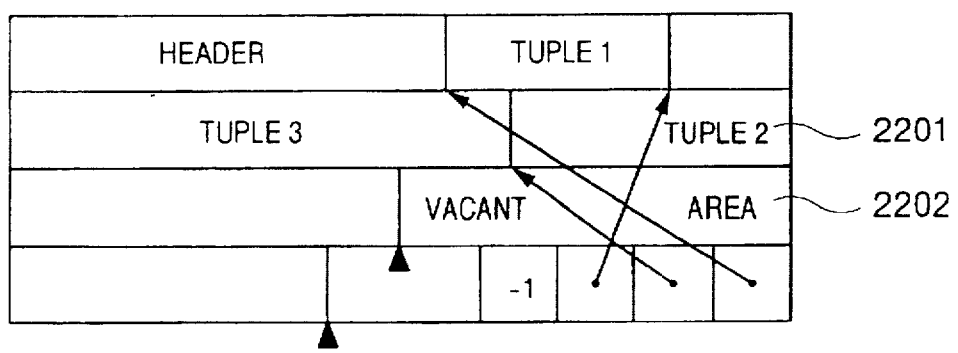

Now, a specific example of updating tuple 2 (1801) in FIG. 22 will be explained with reference to FIGS. 18 to 21.

(5) Example of Tuple Update (when tuple size is the same)

In this case, a tuple after update is overwritten on 1801 according to the algorithm shown in FIGS. 16A to 16C.

(6) Example of Tuple Update (when tuple size decreases)

In the case where the tuple size is reduced, a tuple after update is overwritten on tuple 2 (1801) after locking the vacant area, and the length reduced is added to the size of the vacant area.

(7) Example of Tuple Update (when tuple size increases)

Figure 19:
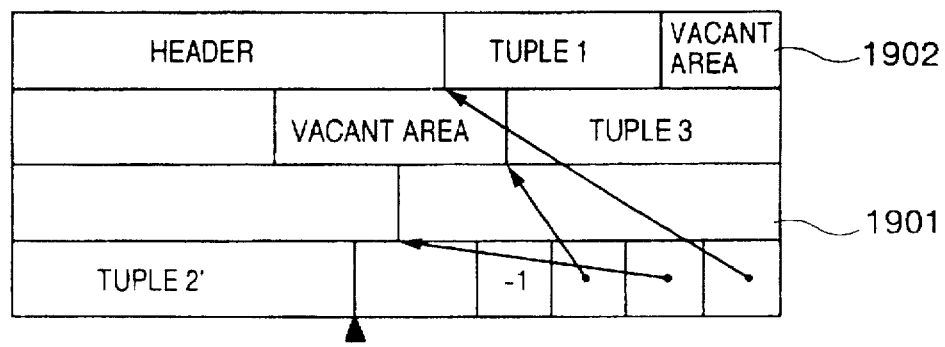

Consider the case in which a tuple is increased in size and the tuple after update is included in the unoccupied area 1802 of the page. The tuple 2 (1901) is included in the unoccupied area as shown in FIG. 19, while the location thus far occupied by tuple 2 is vacated (1902). Also, in the case where a tuple facing the unoccupied area is updated as in the case of updating tuple 3 in FIG. 18, tuple 3 may be overwritten directly if the tuple length after update is smaller than the sum of the tuple length before update and the length of the unoccupied area.

Next, consider the case in which a tuple after update cannot be accommodated in the unoccupied area but compaction is possible to accommodate the tuple after update in the unoccupied area after compaction. First, the page is compacted, and tuple 2 (2001) after update is added.

Assume the case where a tuple cannot be accommodated in the page even after compaction, or where it can be accommodated in the page by compaction but such a compaction is impossible. As shown in FIG. 21, first, a page 2103 in which tuple 2 can be added (2104) is determined and a tuple is added. After that, the vacant area of page 2102 is locked, tuple 2 is converted into a point format (2101), and the physical identification number of tuple 2 (2104) is stored in the point format.

2. Example of Rollback

Now, a specific example of roll back processing will be explained. In the actual process, information required for rollback is acquired by tuple addition or deletion. Such operations are not explained in the embodiment under consideration.

(1) Specific Example of Rollback for Tuple Deletion

Figure 12:
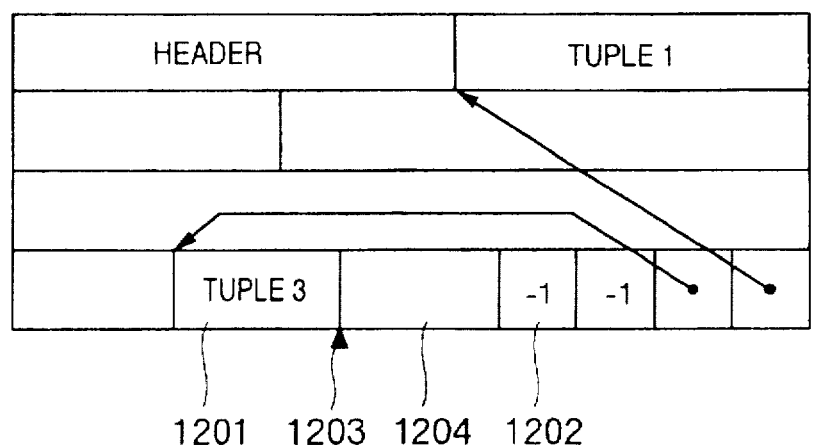

FIG. 12 shows the state immediately after tuple 2 is deleted from the page shown in FIG. 11 by a particular transaction and tuple 3 (1201) is added to the same page and committed by another transaction.

Now, explanation will be made about a specific example in which a particular transaction is rolled back. The algorithm shown in FIG. 10 is used for rollback to delete a tuple. First, the page involved is locked. The tuple deleted is indicated by slot 1202, which slot is X-locked at the time of tuple deletion. Therefore, other transactions are not used. As the next step, the position where the deleted tuple 2 is thus added is determined. In the process, the unoccupied area offset of the page and the tuple trailing end offset both represent the position indicated by 1203. Since the unoccupied area 1204 is not sufficiently large to add tuple 2, compaction is required. As shown by step 1003 in FIG. 10, therefore, the improved compaction is carried out (by the algorithm shown in FIG. 6).

Figure 13:
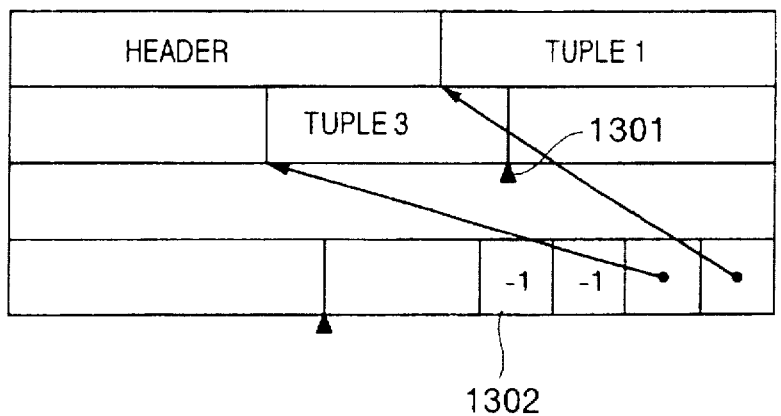

As a result, as shown in FIG. 13, the tuple trailing end offset (1301) is changed. It then becomes possible to add tuple 2 from the position indicated by 1301. In the process, the physical identifier of the tuple is constituted of the page number of the corresponding page and the slot number (=4) of slot 1302. This is the same value as before tuple depletion. The tuple can thus be rolled back without changing the physical identifier of the tuple. In the case where the size of the unoccupied area is larger than the size required for adding tuple 2, the page is not compacted, and a tuple is added from the position indicated by the leading offset of the unoccupied area thereby to update the value of the leading offset of the unoccupied area and the tuple trailing end offset.

(2) Specific Example of Rollback for Tuple Addition and Deletion

Figure 14:
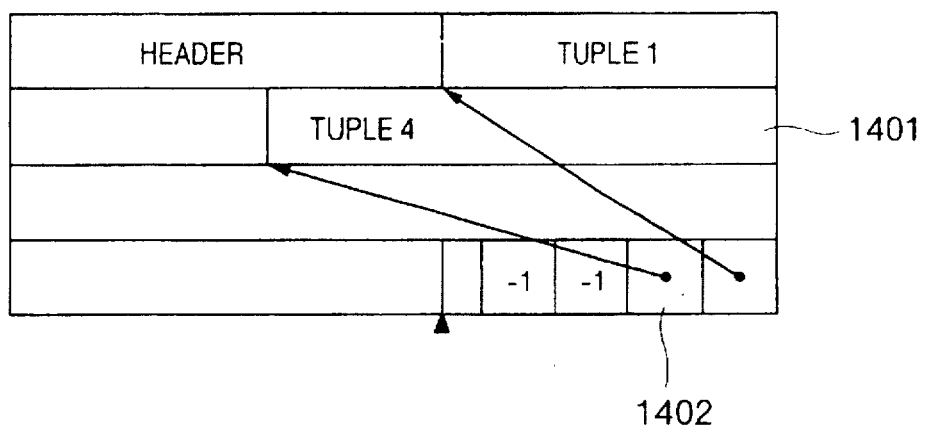

Now, explanation will be made about a specific example of rollback for tuple addition and deletion with the same transaction. FIG. 14 shows an example in which tuple 2 is deleted from the page in the state shown in FIG. 11 and tuple 4 (1401) is subsequently added.

Figure 15:
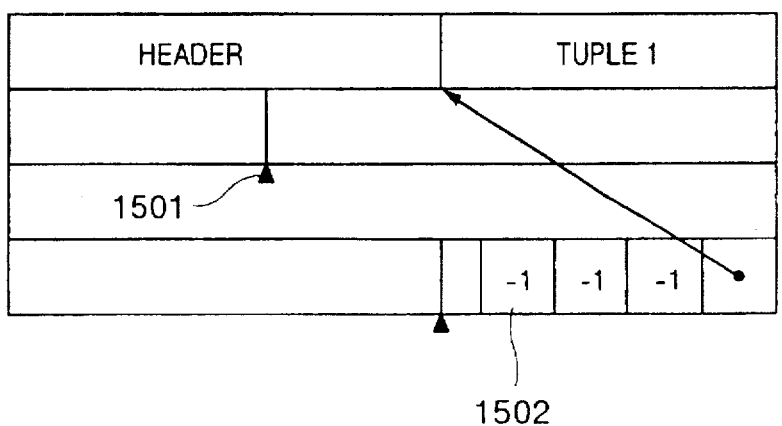

In rolling back a transaction, first, tuple 1401 is deleted. The algorithm shown in FIG. 9 is used for rollback to add a tuple. The page involved is locked, and the value of slot 1402 is set to −1. After that, the tuple trailing end offset and the size of the vacant area of the page are updated to unlock the particular page. The state of the page after deletion of tuple 4 is shown in FIG. 15. Numeral 1501 designates the position representing the tuple trailing end offset.

As the next step, tuple 2 that has been deleted is rolled back. The algorithm shown in FIG. 12 is used for adding tuple 2. First, the page in which tuple 2 has thus far existed is locked. Then, the position for tuple addition is determined in a manner which will not be described as it is similar to case (1).

(3) Specific Example of Rollback for Updating a Tuple

In the case where the tuple size remains unchanged, the tuple before update is overwritten directly. When a tuple is lengthened and accommodated in the same page as shown in FIGS. 19 and 20, the tuple before update is overwritten as it is. The example of FIG. 20 as rolled back is shown in FIG. 22. Consequently, tuple 2 is restored as indicated by 2201, and the remaining part constitutes a vacant area 2202. Also, the tuple trailing end position is required to be updated.

Figure 23:
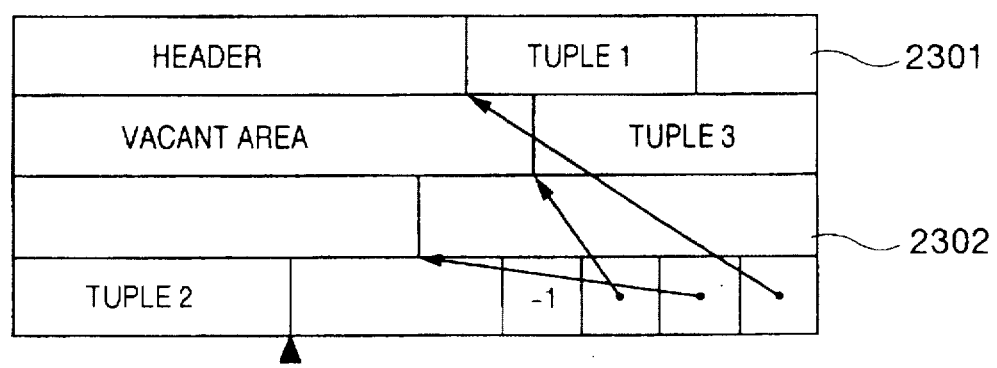

In the case where tuple 2' cannot be accommodated in the same page but pointed to another page as shown in FIG. 21, first, the point format 2101 is used as a vacant area 2301 as shown in FIG. 23, and tuple 2 (2302 in FIG. 23) before update is added from the leading offset of the unoccupied area. After that, tuple 2 (2104) of page 2103 is deleted.

In the case where the tuple is shortened, the process is carried out in a manner similar to restoration of the point format.

As described above, in the tuple updating process, the slot value of the tuple before update is set to 0. As a result, the slot corresponding to the tuple before update is not combined into the unoccupied area by the compaction process shown in FIG. 5. Consequently, at the time of rollback, the physical identification number of the tuple before update is prevented from being changed on the one hand and the total size of vacant areas is prevented from becoming inaccurate on the other hand.

Now, another embodiment of the invention will be explained. The feature of this embodiment is that the tuples constituting a vacant area are not considered collectively as a single vacant area but each vacant tuple is considered as an object for storing a tuple to be added.

Figure 24:
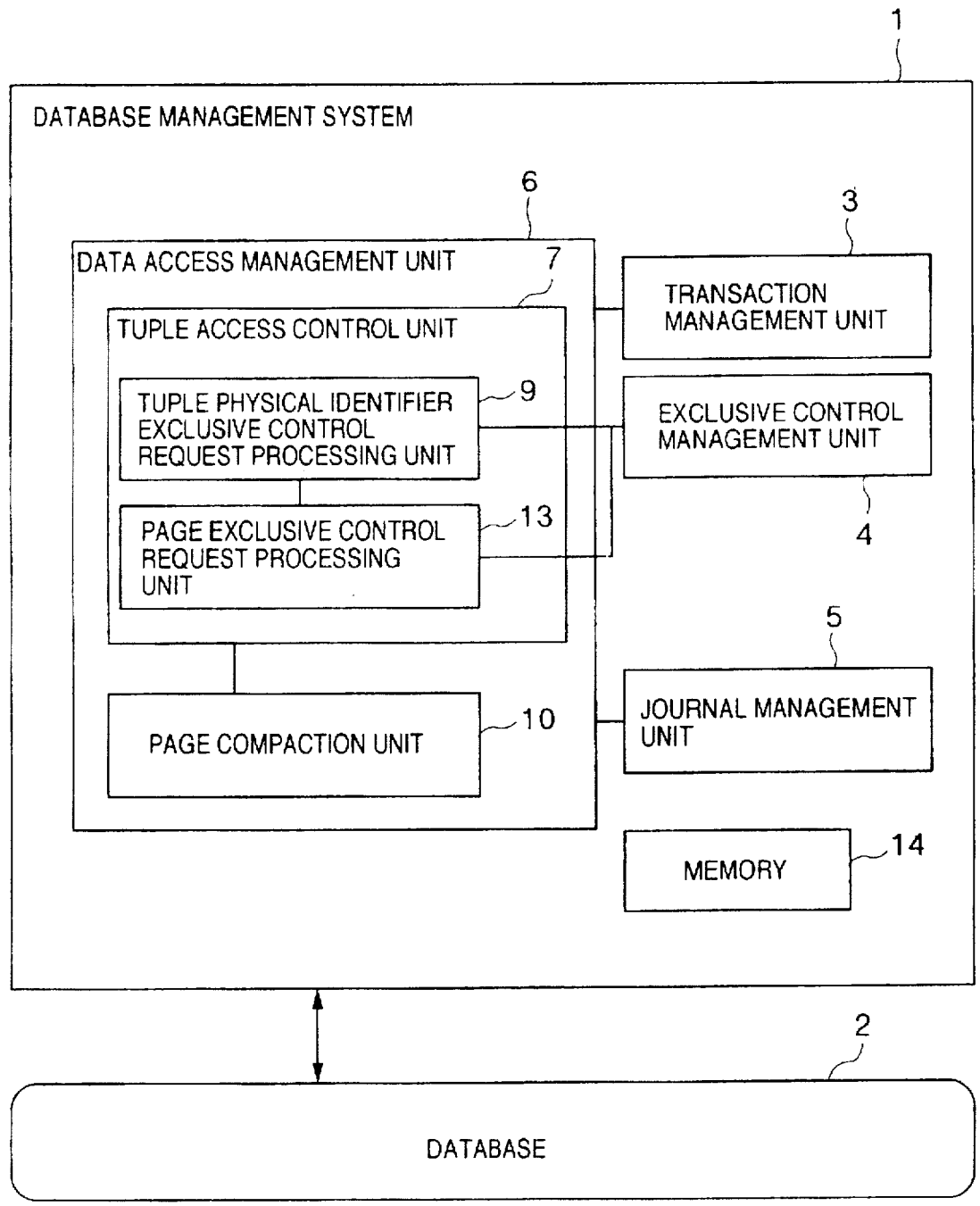
FIG. 24 is a block diagram showing a database management system.

A block diagram of a database management system according to this embodiment is shown in FIG. 24. This embodiment has substantially the same configuration as the embodiment shown in FIG. 1.

The tuple-oriented exclusive control method provided by the embodiment under consideration is incorporated into a data access management unit 6. The data access unit 6 includes a tuple access control unit 7 and a page compaction unit 10. Also, the tuple access control unit 7 includes a tuple physical identifier exclusive control request unit 9 and a page exclusive control request unit 13.

Figure 25:
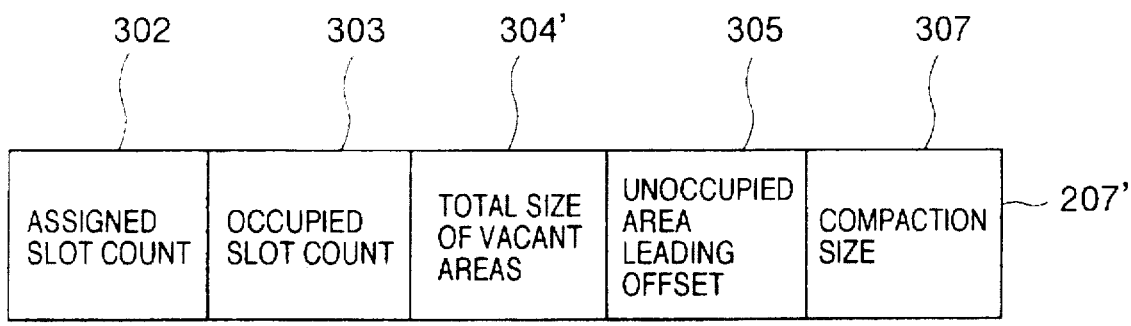
FIG. 25 is a diagram showing the data structure of a page header.

First, FIG. 25 shows the data structure of a page header for managing the state of the page used in the present embodiment. The page header 207' shown in FIG. 25 is adapted for managing the maximum slot number 302 assigned to the page in the page header 207 in FIG. 2, the number of slots in use 303, the total size 304' of vacant areas generated when a tuple is deleted or shortened (somewhat different from the one shown in FIG. 2 as described later), the leading offset 305 of the unoccupied area 205 and the information on the compaction size 307 stored as the size of a vacant area remaining after tuple addition in the tuple area from which a tuple has been deleted.

Figure 26:
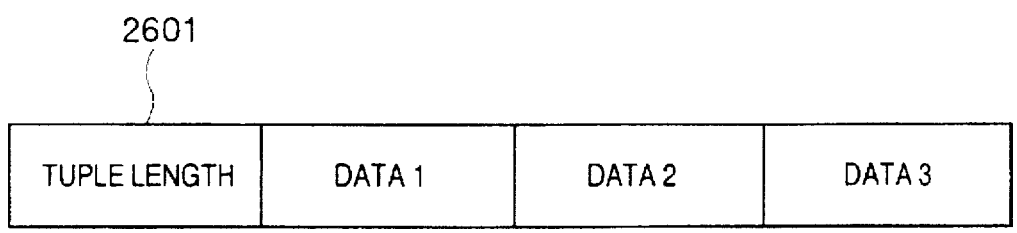
FIG. 26 is a diagram showing an example structure of a tuple.

The compaction size 307 is initialized (cleared to 0) when a page is newly assigned or compacted. An example structure of a tuple stored in the page is shown in FIG. 26. The structure of this tuple may be identical to that shown in the embodiment of FIG. 1. Data for managing the tuple length 2601 representing the physical length of the tuple is stored in the head of the tuple, and data constituting the tuple in the succeeding areas. Decision as to whether a tuple to be added in an area of a tuple deleted can be stored or not is made by referring to the tuple length 2601.

Figure 27A:
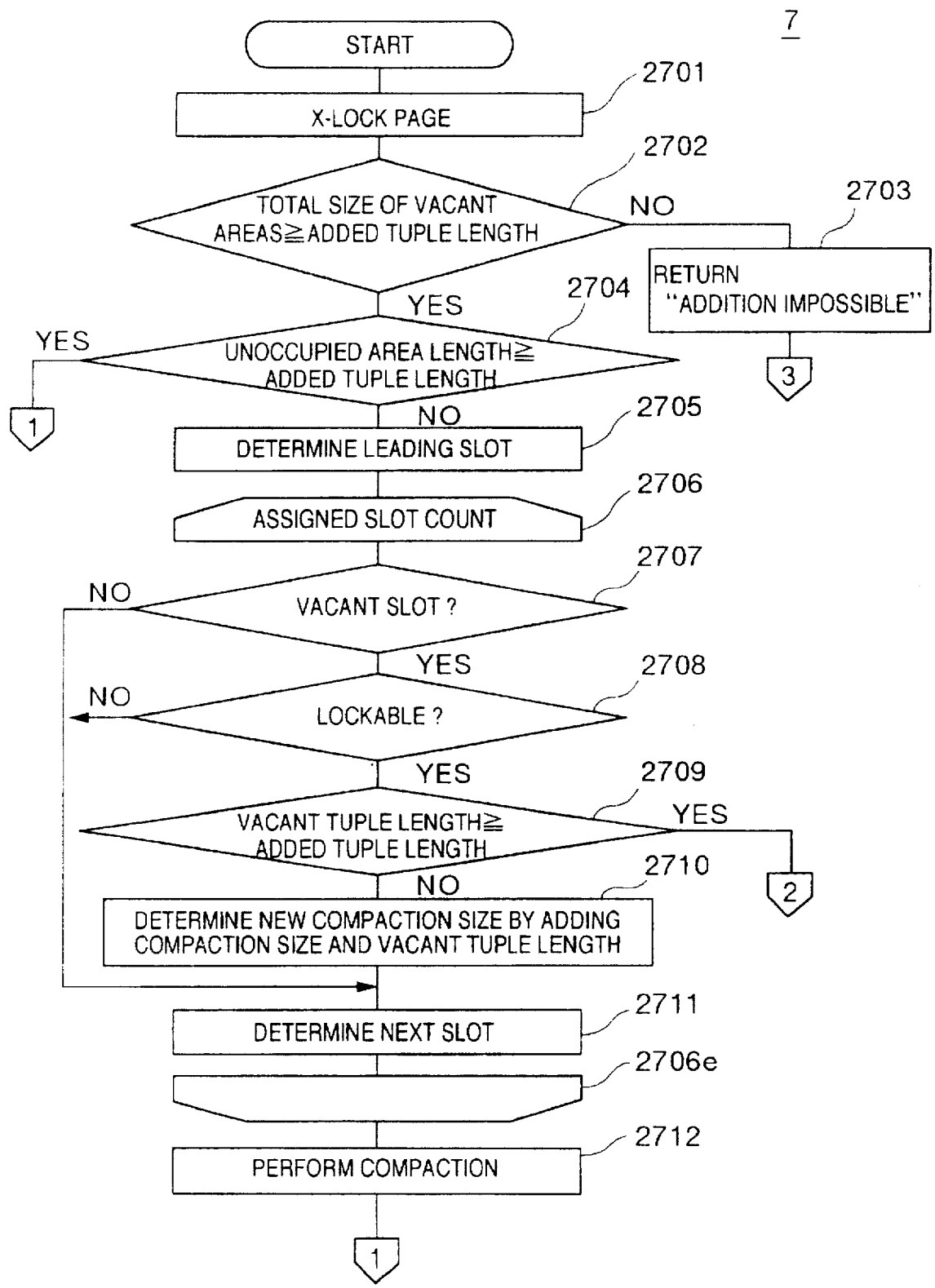
FIGS. 27A to 27B are flowcharts showing an algorithm for adding a tuple.
Figure 27B:
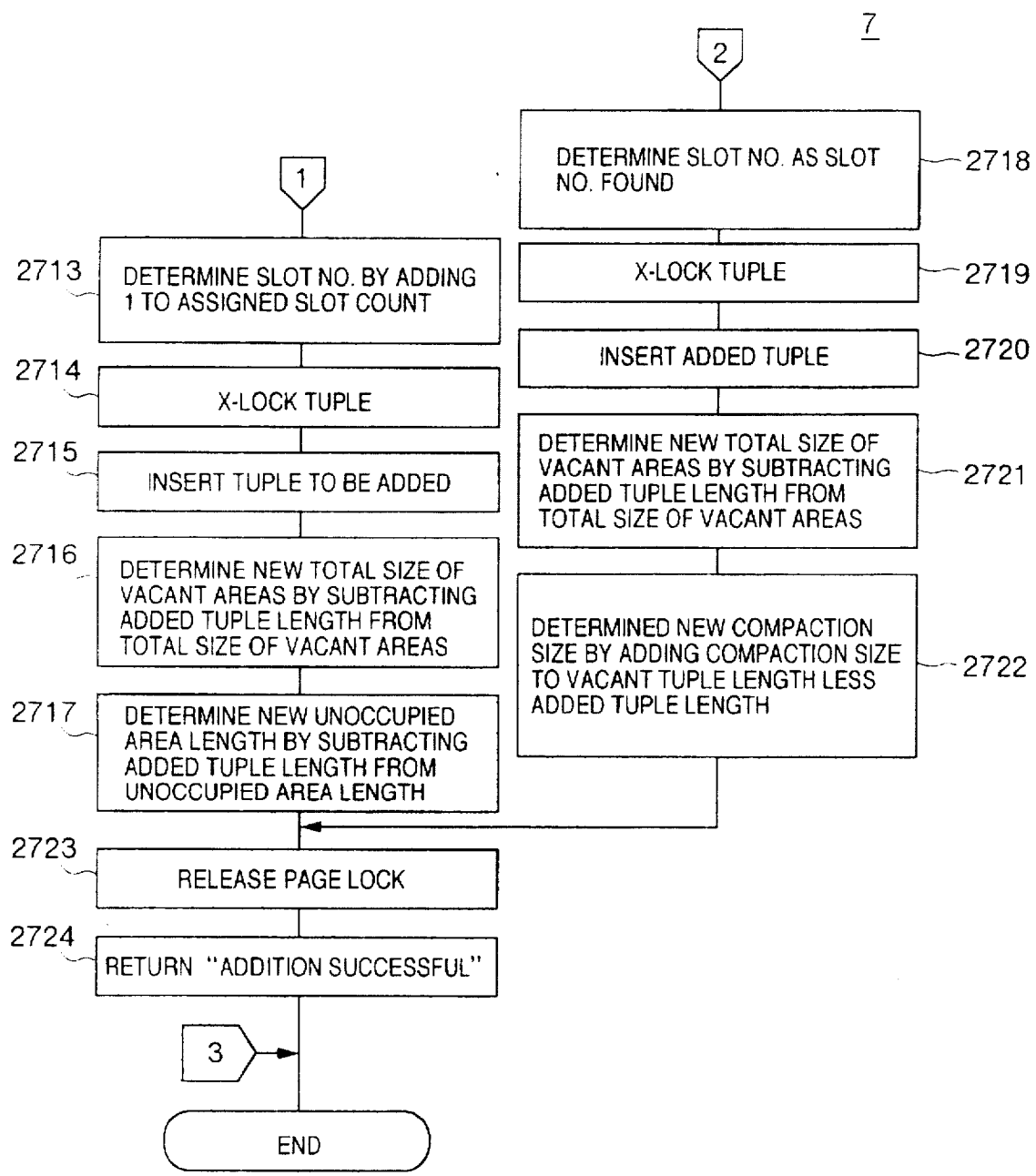

FIGS. 27A and 27B show an algorithm for adding a tuple according to the embodiment under consideration. This algorithm is executed at the tuple access control unit 7 in FIG. 24.

When a tuple addition is requested, first; a page constituting a candidate for addition is searched for and the same page is X-locked. The page can alternatively be locked by use of a semaphore. Also, it is assumed that the request for fixing or releasing the page to or from memory is effected at the same time as the request of page lock or release.

Step 2702 compares the total size 304' of the vacant areas in the page header 207 for managing the internal state of the page with the length of a tuple to be added, and decides whether the tuple to be added can be added to the page. If decision is that there is no sufficient vacant area at this time point, no tuple can be added to the page and the "addition impossible" signal is returned (step 2703). Then a page constituting the next candidate is searched for. In the process, the total size 304' of vacant areas referred to is the total sum of all vacant areas in the page including the size of unoccupied areas.

When step 2702 decides that a tuple can be added, on the other hand, the next decision is as to whether the tuple to be added can be accommodated in the unoccupied area of the page (step 2704). The length of the unoccupied area can be determined using the leading offset 305 of the unoccupied area in the page header 207' for managing the internal state of the page.

In the case where the decision shows that the unoccupied area has no sufficient space to accommodate the tuple to be added, step 2705 defines the leading slot of the page, and step 2706 loops the number of times equal to the assigned slots thereby to determine a usable slot. Step 2707 decides whether the particular slot is vacant or not (If the tuple indicated by the slot is deleted, the slot is vacant, and the slot value represents an inverted value of an offset from the head of the page containing the tuple or the slot value assumes −1).

In the case where the slot is vacant, the particular slot is used to test whether the physical identifier of the tuple can be X-locked or not (step 2708). If the X-locking is possible, step 2709 decides whether the tuple length 2601 for the tuple area indicated by the deleted slot is longer than the length of the tuple to be added. In the case where the length of the area of the deleted tuple is longer than the tuple to be added, it is decided that the tuple to be added is to be stored in the tuple area involved.

In the case where the deleted tuple is shorter than the length of the tuple to be added, by contrast, the tuple area cannot be used for storage. In this case, however, in order to use the tuple length of the vacant tuple obtained at step 2709 subsequently as data for compaction, the tuple length of the vacant area is added to the compaction size 307 of the page header 207' for managing the internal state of the page (step 2710). At the same time, the value of the vacant slot is updated to −1.

In the case where the answer at steps 2707, 2708 and 2709 is NO, the next slot is determined (step 2711) and the looping is carried out again (step 2706e). Assume that an investigation of all the assigned slots shows that a slot for adding a tuple cannot be determined, step 2712 performs compaction using the compaction size 307 of the page header 207' for managing the internal state of the page.

In the case where the answer at step 2704 is YES or after performing the compaction, on the other hand, a slot number is newly assigned to the tuple to be added and the assigned slot count is set to +1 (step 2713). Then the physical identifier of the tuple is X-locked using the slot number determined at step 2713 (step 2714). A tuple to be added is inserted from the head of the unoccupied area to constitute a slot value as the head of the unoccupied area (step 2715). Upon complete insertion, the total size 304' of the vacant area of the page header 207' and the leading offset 305 of the unoccupied area are updated (steps 2716 and 2717).

In the case where the answer at step 2709 is YES, the applicable slot number is constituted as the determined slot number, i.e., the slot number capable of locking (step 2718). The physical identifier of the tuple thus is X-locked (step 2719). The tuple to be added is then inserted from the area indicated by the particular slot value, and the sign of the slot value expressed in binary code is reversed (step 2720). Upon complete insertion, the total size 304' of the vacant area of the page header 207' is updated (step 2721), and the compaction size 307 of the page header 207' is updated (step 2722). When tuple addition is complete, the page lock is released (step 2723) and the "addition successful" signal is returned (step 2724).

Figure 28:
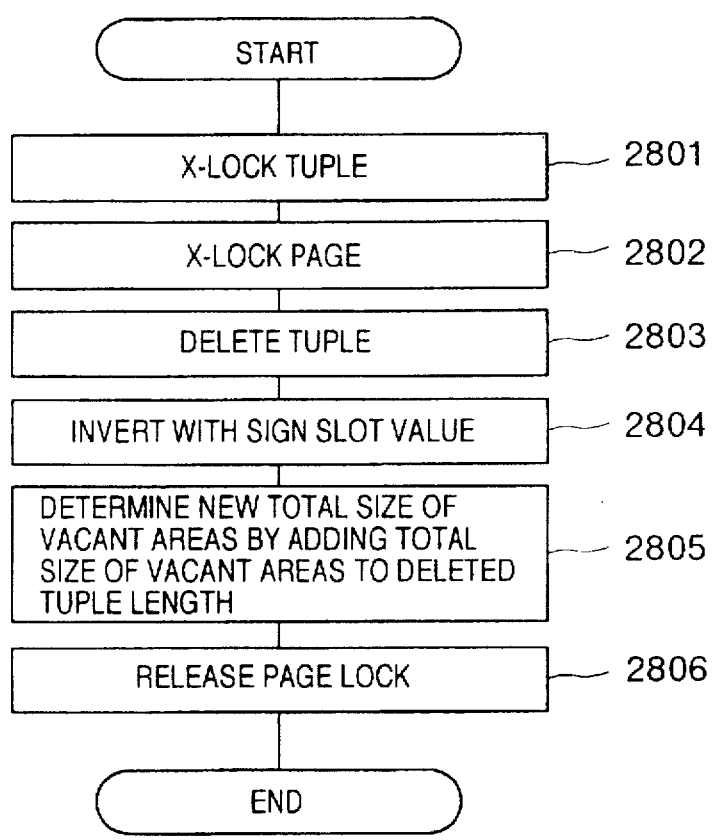
FIG. 28 is a flowchart showing an algorithm for deleting a tuple.

An algorithm for tuple deletion is shown in FIG. 28. First, the physical identifier of the tuple is X-locked (step 2801). The tuple locking, however, is not required when the tuple to be deleted is X-locked at the time of search. The page containing the tuple 1 is X-locked (step 2802). Then, step 2803 deletes the tuple. In the process, the sign of the slot value of the tuple expressed in binary notation is inverted into deletion mode (step 2804). The total size 304' of vacant areas is updated (step 2805). Upon complete tuple deletion, the page lock is released (step 2806).

In this way, when a tuple is deleted, the area of the tuple deleted is kept intact by setting the slot in deletion mode. At the time of roll back, therefore, the area of the deleted tuple can be restored simply by reversing the sign of the slot area. In other words, since exclusive control obtains for the deleted tuple, data for the tuple area is guaranteed.

Expression of the tuple deletion mode according to this embodiment is not limited to the method using the sign reversal of the slot value but can also be realized by identifying the tuple deletion with a flag set in the slot area or by setting a flag in the header of the tuple or the like indicating the deletion mode.

What is claimed is:

1. A method of exclusive control of an area in a page for a tuple-oriented file system, wherein each of a plurality of pages to be accessed by a plurality of transactions executed in parallel includes a tuple area having a plurality of tuples in use, a vacant area having a tuple deleted, and an unoccupied area not used by a tuple, said method comprising the steps of:

comparing a length of a tuple to be added with a size of the unoccupied area in said page in response to processing for tuple addition due to a transaction;

comparing a length of said tuple to be added with a length of each tuple providing a vacant area in said page when the length of said tuple to be added is larger than said size of said unoccupied area;

adding said tuple to be added in a tuple which may exist in said page and which provides a vacant area having a length larger than said tuple to be added;

carrying out compaction in said page and thereby generating a single unoccupied area including said vacant area and said unoccupied area when there exists no tuple providing a vacant area having a length larger than said tuple to be added in said page; and adding said tuple to be added to said single unoccupied area.

2. A method of exclusive control of an area in a page for a tuple-oriented file system, wherein each of a plurality of pages to be accessed by a plurality of transactions executed in parallel includes a tuple area having a plurality of tuples in use, a vacant area having a tuple deleted, and an unoccupied area not used by a tuple, said method comprising the steps of:

comparing a length of a tuple to be added with a size of the unoccupied area in said page in response to processing for tuple addition due to a transaction;

comparing a length of said tuple to be added with a length of each tuple providing a vacant area in said page when the length of said tuple to be added is larger than said size of said unoccupied area; and adding said tuple to be added, which is uncompacted, in a tuple which may exist in said page and which provides a vacant area having a length larger than said tuple to be added when the size of the vacant area is larger than the length of said tuple to be added.

3. A method of exclusive control of an area in a page for a tuple-oriented file system, wherein each of a plurality of pages to be accessed by a plurality of transactions executed in parallel includes a tuple area having a plurality of tuples in use, a vacant area having a tuple deleted, and an unoccupied area not used by a tuple, said method comprising the steps of:

comparing a length of a tuple to be added with a size of the unoccupied area in said page in response to processing for tuple addition due to a transaction;

comparing a length of said tuple to be added with a length of each tuple providing a vacant area in said page when the length of said tuple to be added is larger than said size of said unoccupied area; and adding said tuple to be added in a tuple which may exist in said page and which provides a vacant area having a length larger than said tuple to be added;

wherein each of the tuples in said page has data representing a tuple length, wherein the contents of a tuple providing a vacant area are stored, and wherein a length of said tuple to be added is compared with the tuple length stored in said tuple providing a vacant area.

4. A method of exclusive control of an area in a page for a tuple-oriented file system, wherein each of a plurality of pages to be accessed by a plurality of transactions executed in parallel includes a tuple area having a plurality of tuples in use, a vacant area having a tuple deleted, and an unoccupied area not used by a tuple, said method comprising the steps of:

comparing a length of a tuple to be added with a size of the unoccupied area in said page in response to processing for tuple addition due to a transaction;

comparing a length of said tuple to be added with a length of each tuple providing a vacant area in said page when the length of said tuple to be added is larger than said size of said unoccupied area; and adding said tuple to be added in a tuple which may exist in said page and which provides a vacant area having a length larger than said tuple to be added;

wherein each page includes a plurality of slots each holding a binary codes value indicating the position of each of the tuples, said binary coded value of the slots being selectively inverted with a sign to indicate that a corresponding tuple constitutes a vacant area.

5. The method according to claim 4, wherein a tuple to be restored is restored by inverting again with a sign an inverted binary code of a slot corresponding to said tuple to be restored in response to a rollback operation of a transaction.

6. A method of exclusive control of an area in a page for a tuple-oriented file system in which each page to be accessed by a plurality of transactions executed in parallel includes a tuple area having a plurality of tuples in use, a vacant area having a tuple deleted and an unoccupied area not used by a tuple, said method comprising the steps of:

locking only the vacant area in the page in response to activation of a first transaction for increasing a size of the vacant area in said page, the unoccupied area remaining unlocked for allowing a new tuple to be added to the unoccupied area when the vacant area is locked; and adding a tuple to the unoccupied area in said page by a second transaction executed in parallel to said first transaction during the locking of said vacant area in said page.

7. The method according to claim 6, wherein each page includes a plurality of slots each holding a value indicating a position of a corresponding one of said tuples in said page, said tuples each having a variable length, and the value of a slot being set to a predetermined value to indicate that a corresponding tuple constitutes a vacant area.

8. A method of exclusive control of an area in a page for a tuple-oriented file system in which each page to be accessed by a plurality of transactions executed in parallel includes a tuple area having a plurality of tuples in use, at least one vacant area having a tuple deleted, and an unoccupied area not used by a tuple, the tuples being added in each page in a positive direction progressively with respect to an address, said method comprising the steps of:

locking the vacant area in a page in response to activation of a transaction for increasing a size of the vacant area in said page;

comparing a length of a tuple to be restored in a rollback operation of said transaction with a size of the unoccupied area in said page in response to said roll back operation;

compacting a partial area including said tuple area and the vacant area in said page and combining a plurality of vacant areas into a single vacant area when said tuple length is larger than the size of said unoccupied area, no compacting being performed when said tuple length is not larger than the size of said unoccupied area; and adding the tuple to be restored from a head of said single vacant area.

9. The method according to claim 8, wherein said single vacant area, produced by the compaction, is added to a trailing end of a last one of said tuples in use in said page.

10. The method according to claim 8, wherein slots are added progressively in a negative direction with respect to an address, each page includes a plurality of slots each holding a value indicating a position of each of the tuples, each tuple having a variable length, and the value of a slot is set to a predetermined value to indicate that a corresponding tuple constitutes a vacant area.

11. A method of exclusive control of an area in a page for a tuple-oriented file system comprising a processing unit for requesting exclusive control of a tuple, a processing unit for requesting exclusive control of a page, a processing unit for deciding whether a vacant area of the page is usable, and a tuple access management means, the method comprising:

carrying out compaction in the page and thereby generating a single unoccupied area including the vacant area and an unoccupied area of the page when there exists no tuple providing a vacant area having a length larger than the tuple to be added in the page; and adding the tuple to be added to the single unoccupied area;

the tuple access management means using said processing units to prevent the vacant area of said page from being used by another transaction during a time when a transaction increasing a total size of the vacant area in the page is active, the other transaction being able to use an unoccupied area of the page even when it is prevented from using the vacant area.

12. The method according to claim 11 for a tuple-oriented file system further comprising a processing unit for requesting exclusive control of the vacant area of the page, wherein the use of said vacant area is prohibited by said processing unit for requesting exclusive control of the vacant area of the page when the vacant area of the page is increased.

13. A method of exclusive control of an area in a page for a tuple-oriented file system comprising a processing unit for requesting exclusive control of a tuple, a processing unit for requesting exclusive control of a page, a processing unit for deciding whether a vacant area of the page is usable, a tuple access management means, and improved compaction means for recompacting tuples, constructing the vacant area of the page from all areas generated by tuple recompaction, and storing a leading position of the vacant area, the method comprising:

the tuple access management means using said processing units to prevent the vacant area of said page from being used by another transaction during time when a transaction increasing a total size of the vacant area in the page is inactive; and performing a rollback operation for increasing the sum of the unoccupied area and the vacant area of the page, wherein a selected one of a tuple deleted from the unoccupied area of said page and a tuple before update are added in the case where the tuple restored by the rollback operation is smaller than or equal to a size of the unoccupied area of said page, said improved compaction means carrying out said roll back operation by adding a tuple from a tuple trailing end in a case where the tuple restored is larger than a size of the unoccupied area of said page.

14. The method according to claim 13, wherein the vacant area of the page can be used only for a process due to said transaction using said improved compaction means in a case where the page has only one active transaction that has executed process increasing a size of the vacant area in said page.

15. The method according to claim 13, wherein said tuple-oriented file system further comprises means for storing a trailing end of a tuple in a page and compaction means for updating a position of the trailing end of the tuple stored in said tuple trailing end storage means at the time of page compaction;

wherein the vacant area adjacent to the unoccupied area is made available for use in a case where only one active transaction for said page has increased a size of the vacant area in said page.

16. The method according to claim 13, wherein said roll back operation for increasing a sum of the unoccupied area and the vacant area in the page further includes the substeps of:

deleting the tuple as part of the roll back operation for tuple addition;

restoring the tuple before update at a position of said tuple as part of the roll back operation for tuple update; and managing as a vacant area generated by the roll back operation for selected one of tuple addition and tuple update.

17. A method of exclusive control of an area in a page for a tuple-oriented file system comprising a processing unit for requesting exclusive control of a tuple, a processing unit for requesting exclusive control of a page, a processing unit for deciding whether an area of a tuple deleted in a page is usable, and a tuple access management means, the method comprising:

the tuple access management means using said processing units to delete a tuple through a preceding transaction for deleting a tuple and introducing a deletion mode by converting tuple position information for a deleted tuple in the page from a positive to a negative value to enable a succeeding transaction to add a tuple in the same page;

requesting exclusive control of the deleted tuple when a sum of a length of the deleted tuple and a length of the unoccupied area of the page is larger than a length of a tuple to be added;

rejecting exclusive control of the deleted tuple to prohibit tuple addition to said area with the deleted tuple when said tuple-deleting transaction is active; and granting exclusive control of the deleted tuple when the tuple-deleting transaction has been completed thereby permitting tuple addition.

18. The method according to claim 17, wherein said tuple-oriented file system further comprises means for storing the deleting state and the vacant state as the unoccupied state of positional information of a tuple in a page, and means for storing a compaction size in information for managing the internal state of the page;

in a case where the sum of a length of the deleted tuple and a length of the unoccupied area is smaller than a length of a tuple to be added at time of tuple addition, said method further comprising the steps of:

deciding whether the area of a deleted tuple in the page is usable;

adding the size of the deleted tuple area to said compaction size and setting positional information of said deleted tuple in vacant state in a case where said deleted tuple area is usable; and performing compaction in the page on the basis of said compaction size in a case where a length of all deleted tuple areas in the page is shorter than that of an area of the tuple to be added, whereby said tuple to be added is inserted into an unoccupied area expanded.

\* \* \* \* \*